(12) United States Patent
Sato et al.

(10) Patent No.: US 12,026,904 B2
(45) Date of Patent: *Jul. 2, 2024

(54) DEPTH ACQUISITION DEVICE AND DEPTH ACQUISITION METHOD

(71) Applicant: Panasonic Intellectual Property Management Co., Ltd., Osaka (JP)

(72) Inventors: Satoshi Sato, Kyoto (JP); Takeo Azuma, Kyoto (JP); Nobuhiko Wakai, Tokyo (JP); Kohsuke Yoshioka, Osaka (JP); Noritaka Shimizu, Osaka (JP); Yoshinao Kawai, Kyoto (JP); Takaaki Amada, Kyoto (JP); Yoko Kawai, Osaka (JP); Takeshi Murai, Kyoto (JP); Hiroki Takeuchi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/119,443

(22) Filed: Mar. 9, 2023

(65) Prior Publication Data
US 2023/0215029 A1 Jul. 6, 2023

Related U.S. Application Data

(63) Continuation of application No. 17/161,060, filed on Jan. 28, 2021, now Pat. No. 11,636,615, which is a
(Continued)

(30) Foreign Application Priority Data

Sep. 18, 2018 (JP) ................ 2018-174277

(51) Int. Cl.
G06T 7/55 (2017.01)
G01S 17/48 (2006.01)
G06T 7/521 (2017.01)

(52) U.S. Cl.
CPC ............... *G06T 7/55* (2017.01); *G01S 17/48* (2013.01); *G06T 7/521* (2017.01); *G06T 2207/10028* (2013.01); *G06T 2207/10048* (2013.01)

(58) Field of Classification Search
CPC . G06T 7/55; G06T 7/521; G06T 2207/10028; G06T 2207/10048; G01S 17/48
See application file for complete search history.

(56) References Cited

U.S. PATENT DOCUMENTS 7,489,345 B2 2/2009 Fukumoto
7,808,512 B1 10/2010 Hutchins
(Continued)

FOREIGN PATENT DOCUMENTS

JP 2-82876 3/1990
JP 2011-64498 3/2011
(Continued)

OTHER PUBLICATIONS

International Search Report dated Dec. 3, 2019 in International (PCT) Application No. PCT/JP2019/035420.
(Continued)

Primary Examiner — Gregory M Desire
(74) Attorney, Agent, or Firm — Wenderoth, Lind & Ponack, L.L.P.

(57) ABSTRACT

A depth acquisition device includes a memory and a processor. The processor performs: acquiring timing information indicating a timing at which a light source irradiates a subject with infrared light; acquiring, from the memory, an infrared light image generated by imaging a scene including
(Continued)

the subject with the infrared light according to the timing indicated by the timing information; acquiring, from the memory, a visible light image generated by imaging a substantially same scene as the scene of the infrared light image, with visible light from a substantially same viewpoint as a viewpoint of imaging the infrared light image at a substantially same time as a time of imaging the infrared light image; detecting a flare region from the infrared light image; and estimating a depth of the flare region based on the infrared light image, the visible light image, and the flare region.

14 Claims, 21 Drawing Sheets

Related U.S. Application Data continuation of application No. PCT/JP2019/035420, filed on Sep. 9, 2019.

(56) References Cited

U.S. PATENT DOCUMENTS

| | | | |
|---|---|---|---|
| 8,411,920 B2* | 4/2013 | Saijo | G06V 10/143 |
| | | | 382/128 |
| 9,378,542 B2 | 6/2016 | Meyers | |
| 9,383,549 B2 | 7/2016 | Ueno | |
| 9,928,592 B2* | 3/2018 | Xiong | G06T 7/521 |
| 10,356,384 B2 | 7/2019 | Wachi | |
| 10,607,352 B2* | 3/2020 | Ortiz Egea | H04N 5/2226 |
| 10,755,418 B2* | 8/2020 | Qiu | H04N 23/56 |
| 10,791,283 B2* | 9/2020 | Bardagjy | G06T 7/521 |
| 10,924,670 B2* | 2/2021 | Liu | G06T 7/33 |
| 11,158,074 B1 | 10/2021 | Kantor | |
| 2010/0046802 A1 | 2/2010 | Watanabe et al. | |
| 2012/0133915 A1* | 5/2012 | Matsuyama | G03F 7/70625 |
| | | | 355/77 |
| 2012/0177252 A1 | 7/2012 | Korekado et al. | |
| 2016/0231807 A1 | 8/2016 | Ogasawara et al. | |
| 2017/0091944 A1 | 3/2017 | Taguchi et al. | |
| 2017/0272651 A1 | 9/2017 | Mathy et al. | |
| 2017/0347086 A1 | 11/2017 | Watanabe | |
| 2018/0130209 A1 | 5/2018 | Price | |
| 2018/0232947 A1 | 8/2018 | Nehmadi et al. | |
| 2021/0150742 A1 | 5/2021 | Sato | |

FOREIGN PATENT DOCUMENTS

| | | |
|---|---|---|
| JP | 2011-103070 | 5/2011 |
| JP | 2011-257956 | 12/2011 |
| JP | 2016-148899 | 8/2016 |
| JP | 2017-67503 | 4/2017 |
| JP | 2017-216678 | 12/2017 |
| KR | 10-2017-0107269 | 9/2017 |

OTHER PUBLICATIONS

R. Zabih et al., "Non-parametric Local Transforms for Computing Visual Correspondence", Proc. of ECCV, pp. 151-158, 1994.

Kaiming He et al., "Guided Image Filtering", IEEE Transactions on Pattern Analysis and Machine Intelligence, vol. 35, Iss. 6, pp. 1397-1409, 2013.

C. Tomasi et al., "Bilateral filtering for gray and color images", IEEE International Conference on Computer Vision (ICCV), pp. 839-846, 1998.

Xiaoyong Shen et al., "Mutual-Structure for Joint Filtering", IEEE International Conference on Computer Vision (ICCV), 2015.

Shuran Song et al., "Semantic Scene Completion from a Single Depth Image", IEEE Conference on Computer Vision and Pattern Recognition (CVPR), pp. 190-198, 2017.

Caner Hazirbas et al. "Deep Depth From Focus", In ArXiv preprint arXiv, 1704.01085, 2017.

Extended European Search Report dated Jan. 31, 2022 in corresponding European Patent Application No. 19861679.9.

* cited by examiner

DEPTH ACQUISITION DEVICE AND DEPTH ACQUISITION METHOD

BACKGROUND

1. Technical Field

The present disclosure relates to depth acquisition devices and the like which acquire a depth of image.

2. Description of the Related Art

Conventionally, a distance measurer for measuring a distance to a subject of image has been proposed (for example, refer to Japanese Unexamined Patent Application Publication No. 2011-64498 (PTL 1)). This distance measurer includes a light source and an imager. The light source irradiates the subject with light. The imager images the light reflected on the subject. Then, the distance measurer converts each pixel value in the image generated by the imaging into a distance to the subject, thereby measuring the distance to the subject. In other words, the distance measurer acquires a depth of the image generated by the imager.

SUMMARY

However, the distance measurer in PTL 1 has a problem of failing to accurately acquire the depth.

Therefore, the present disclosure provides a depth acquisition device capable of accurately acquiring a depth of an image.

In accordance with an aspect of the present disclosure, a depth acquisition device includes: a memory; and a processor, wherein the processor performs: acquiring timing information indicating a timing at which a light source irradiates a subject with infrared light; acquiring an infrared light image stored in the memory, the infrared light image being generated by imaging a scene including the subject with the infrared light according to the timing indicated by the timing information; acquiring a visible light image stored in the memory, the visible light image being generated by imaging a substantially same scene as the scene of the infrared light image, with visible light from a substantially same viewpoint as a viewpoint of the imaging the infrared light image at a substantially same time as an imaging time of imaging the infrared light image; detecting a flare region from the infrared light image; and estimating a depth of the flare region based on the infrared light image, the visible light image, and the flare region.

It should be noted that general or specific aspects of the present disclosure may be implemented to a system, a method, an integrated circuit, a computer program, a computer-readable recording medium such as a Compact Disc-Read Only Memory (CD-ROM), or any given combination thereof. The recording medium may be a non-transitory recording medium.

The depth acquisition device according to the present disclosure is capable of accurately acquiring a depth of an image. Additional advantages and effects of the aspect of the present disclosure will be apparent from the Description and the Drawings. The advantages and/or effects may be individually obtained by the various embodiments and the features of the Description and the Drawings, which need to all be provided in order to obtain one or more such advantages and/or effects.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

Figure 1:
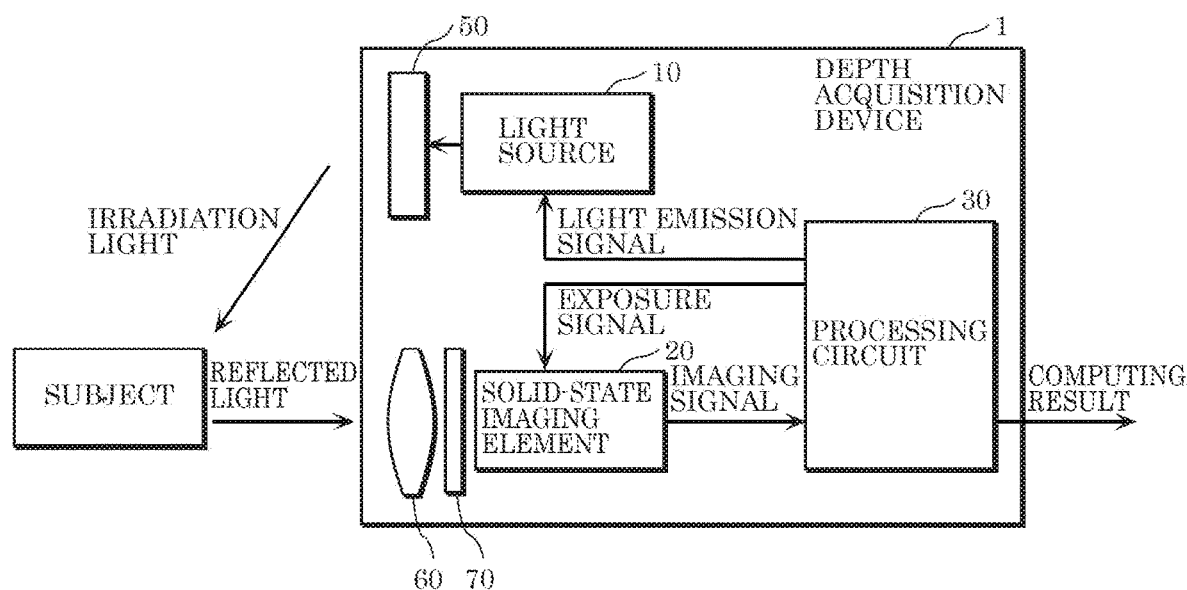
FIG. 1 is a block diagram illustrating a hardware structure of a depth acquisition device according to Embodiment.

DETAILED DESCRIPTION OF THE EMBODIMENT (Findings on which the Present Disclosure is Based)

The present inventors have found that the following problems may occur in connection to the distance measurer of PTL 1 described in the "BACKGROUND ART" section.

The distance measurer of PTL 1 irradiates light from a light source to a subject, and acquires an image by imaging the subject irradiated with light to measure a depth of the image. In the measurement of the depth, TOF (Time Of Flight) is used. In such a distance measurer, imaging at mutually different imaging conditions is performed to improve distance measurement accuracy. That is, the distance measurer performs imaging according to a predetermined imaging condition, and depending on that imaging result, sets an imaging condition different from the predetermined imaging condition. Then, the distance measurer performs imaging again according to the set imaging condition.

However, in an image obtained by the imaging, flare, ghost, or luminance saturation, etc. may occur. From this image, in which such flare and the like have occurred, alone, it is not possible to measure a depth correctly. Further, there may be a case in which it is difficult to suppress occurrence of flare and the like in a simple manner even if imaging condition is changed. Further, if a distance measurer installed on a vehicle repeats imaging at mutually different imaging conditions while the vehicle is travelling, since the viewing position of the imaging which is repeatedly performed differs, the each scene of a plurality of images to be obtained will be different. That is, it is not possible to repeat imaging on the same scene, and therefore it is not possible to appropriately estimate a depth of an image showing the scene, particularly a depth of region in which flare and the like have occurred.

In order to solve the above problem, a depth acquisition device in accordance with an aspect of the present disclosure includes: a memory; and a processor, wherein the processor performs: acquiring timing information indicating a timing at which a light source irradiates a subject with infrared light; acquiring an infrared light image stored in the memory, the infrared light image being generated by imaging a scene including the subject with the infrared light according to the timing indicated by the timing information; acquiring a visible light image stored in the memory, the visible light image being generated by imaging a substantially same scene as the scene of the infrared light image, with visible light from a substantially same viewpoint as a viewpoint of the imaging the infrared light image at a substantially same time as an imaging time of imaging the infrared light image; detecting a flare region from the infrared light image; and estimating a depth of the flare region based on the infrared light image, the visible light image, and the flare region. It should be noted that the flare region is a region where flare, ghost, saturation of luminance, or smear has occurred.

Since, this allows the flare region to be detected from the infrared light image and, in that flare region, a depth is estimated based on not only the infrared light image but also the visible light image, it is possible to appropriately acquire the depth of the flare region. That is, the scenes to be imaged are substantially the same between the infrared light image and the visible light image, and the viewpoint and the imaging time are also substantially the same. Here, one example of images of substantially the same scene, which are imaged at substantially same viewpoint and imaging time, are images imaged by different pixels of the same imaging element. These images are similar to each channel image of red, green, and blue of a color image imaged with a color filter of Bayer array, and the viewing angle, viewpoint point, and imaging time of each image are substantially equal to each other. The image of the substantially same scene imaged at substantially same viewpoint and the imaging time will not differ in the position on the image of a subject not less than two pixels in each imaged image. For example, when point light source having visual light and infrared component is present in a scene, and only one pixel is imaged to have higher luminance in a visual light image, the point light source is imaged in the infrared light image as well within the distance closer than two pixels from the pixel corresponding to the position of the pixel imaged in the visible light image. Moreover, the substantially same imaging time indicates that the difference in the imaging time is equal within one frame of less. Therefore, the infrared light image and the visible light image have high correlation with each other. Further, flare and the like are a phenomenon which is dependent on wavelength, and it is likely that even if flare and the like have occurred in the infrared light image, flare and the like have not occurred in the visible light image. Therefore, information lacking in the flare region can be supplemented from a region in the visible light image corresponding to the flare region (that is, a corresponding region). Consequently, it is possible to appropriately acquire the depth of a flare region.

For example, it is possible that in the estimating of the depth of the flare region, the processor performs: estimating first depth information indicating a depth at each position in the infrared light image; estimating second depth information indicating a corrected depth at each position in the flare region, the corrected depth being obtained by correcting, based on the visible light image, a depth at each position in the flare region which is indicated in the first depth information; and generating third depth information indicating (i) a depth at each position in a region other than the flare region in the infrared light image which is indicated in the first depth information and (ii) a depth at each position in the flare region in the infrared light image which is indicated in the second depth information. It should be noted that in the estimating of the first depth information, TOF, etc. may be applied to the infrared light image.

As a result of this, the third depth information indicates a depth obtained from the infrared light image as a depth of a region other than the flare region in the infrared light image, and a depth obtained from the infrared light image and corrected based on the visible light image as a depth of the flare region of the infrared light image. Therefore, even in a case where there is a flare region in an infrared light image, it is possible to appropriately estimate the depth of the entire infrared light image.

Furthermore, it is possible that in the detecting of the flare region, the processor performs detecting, as the flare region, a region having a luminance not less than a first threshold in the infrared light image.

Since the luminance within a flare region tends to be higher than the luminance outside the flare region, it is possible to appropriately detect a flare region by detecting, as the flare region, a region having a luminance not less than the first threshold, out of the infrared light image.

It is also possible that in the detecting of the flared region, the processor performs detecting, as the flared region, a region having a luminance not less than a first threshold and satisfying a predetermined condition in the infrared light image, and the predetermined condition is that a correlation value between (i) an image feature amount in a first region of the infrared light image and (ii) an image feature amount in a second region of the visible light image is less than a second threshold, the second region corresponding to the first region. For example, it is possible that the image feature amount in the first region of the infrared light image is an edge included in the first region, and that the image feature amount in the second region of the visible light image is an edge included in the second region. It is further possible that the image feature amount in the first region of the infrared light image is a luminance in the first region, and that the image feature amount in the second region of the visible light image is a luminance in the second region.

The correlation between an image feature amount in the flare region of the infrared light image and an image feature amount in a region of the visible light image corresponding to the flare region tends to be lower. Therefore, it is possible to more appropriately detect a flare region by detecting, as the flare region, a region having a higher luminance and lower correlation of the image feature amount in the infrared light image.

It is also possible that in the detecting of the flared region, the processor performs for each of one or more higher luminance regions each having a luminance not less than a first threshold in the infrared light image: (i) generating a first converted image by executing Census transform on an image in the each of the one or more higher luminance regions; (ii) generating a second converted image by executing Census transform on an image in a region of the visible light image, the region corresponding to the each of the one or more higher luminance regions; and detecting, as the flare region, a higher luminance region having a Humming distance greater than a third threshold from the one or more higher luminance regions, the Humming distance being a Humming distance between the first converted image and the second converted image.

This makes it possible to appropriately detect a flare region.

It is also possible that in the estimating of the depth of the flare region, the processor performs: estimating depth information indicating a depth at each position in the infrared light image; and correcting a depth at each position in the flare region which is indicated in the depth information, by inputting the infrared light image, the visible light image, the flare region, and the depth information into a learning model.

If a learning model is trained in advance to output a correct depth at each position in the flare region upon input of the infrared light image, the visible light image, the flare region, and the depth information, it is possible to appropriately correct the depth information estimated from the infrared light image. That is, it is possible to appropriately correct the depth at each position in the flare region indicated by the depth information.

Furthermore, a depth acquisition device in accordance with another aspect of the present disclosure may include: a memory; and a processor, wherein the processor performs: acquiring timing information indicating a timing at which a light source irradiates a subject with infrared light; acquiring an infrared light image stored in the memory, the infrared light image being generated by imaging a scene including the subject with the infrared light according to the timing indicated by the timing information; acquiring a visible light image stored in the memory, the visible light image being generated by imaging a substantially same scene as the scene of the infrared light image, with visible light from a substantially same viewpoint as a viewpoint of the imaging the infrared light image at a substantially same time as an imaging time of imaging the infrared light image; estimating depth information indicating a depth at each position in the infrared light image; and correcting a depth at each position in a flare region in the infrared light image, by inputting the infrared light image, the visible light image, and the depth information into a learning model, the depth at each position in the flare region being indicated in the depth information.

If a learning model is trained in advance to output a correct depth at each position in the flare region upon input of the infrared light image, the visible light image, and the depth information, it is possible to appropriately correct the depth information estimated from the infrared light image. That is, it is possible to appropriately correct the depth at each position in the flare region indicated by the depth information without detecting the flare region.

In accordance with still another aspect of the present disclosure, a depth acquisition device includes: a memory; and a processor, wherein the processor performs: acquiring an infrared light image stored in the memory, the infrared light image being generated by imaging with infrared light; acquiring a visible light image stored in the memory, the visible light image being generated by imaging with visible light from a substantially same viewpoint as a viewpoint of the imaging the infrared light image at a substantially same timing as the timing of imaging the infrared light image; detecting, as a flare region, a region showing flare from the infrared light image; and estimating a depth of the flare region based on the visible light image. Moreover, when the visible light image and the infrared light image are respectively segmented into flare region and other regions, a depth is estimated for the flare region based on the visible light image, and the depth is estimated for other regions based on the infrared light image.

This makes it possible to appropriately acquire a depth of the flare region as well as in the depth acquisition device according to the above-described one aspect of the present disclosure.

It should be noted that general or specific aspects of the present disclosure may be implemented to a system, a method, an integrated circuit, a computer program, a computer-readable recording medium such as a Compact Disc-Read Only Memory (CD-ROM), or any given combination thereof. The recording medium may be a non-transitory recording medium.

Hereinafter, an embodiment will be described in detail with reference to the accompanying Drawings.

It should be noted that the following embodiment is a general or specific example of the present disclosure. The numerical values, shapes, materials, elements, arrangement and connection configuration of the elements, steps, the order of the steps, etc., described in the following embodiment are merely examples, and are not intended to limit the present disclosure.

It should also be noted that the respective figures are schematic diagrams and are not necessarily precise illustrations. Additionally, components that are essentially the same share like reference signs in the figures.

Embodiment

[Hardware Configuration]

FIG. 1 is a block diagram illustrating a hardware configuration of depth acquisition device 1 according to Embodiment. Depth acquisition device 1 according to the present embodiment has a hardware configuration which is capable of acquiring an image based on infrared light (or near infrared light) and an image based on visible light by imaging of a substantially same scene, the imaging being performed at a substantially same viewpoint and imaging time. It should be noted that substantially same means "the same to the extent that the effects in the present disclosure can be achieved."

As shown in FIG. 1, depth acquisition device 1 is configured to include light source 10, solid-state imaging element 20, processing circuit 30, diffusion plate 50, lens 60, and band-pass filter 70.

Light source 10 irradiates irradiation light. More specifically, light source 10 emits irradiation light to be irradiated to a subject at a timing indicated by a light emission signal generated in processing circuit 30.

Light source 10 is configured to include, for example, a capacitor, a driving circuit, and a light emitting element, and emits light by driving the light emitting element with electric energy accumulated in the capacitor. The light emitting element is implemented by, as an example, a laser diode, a light emitting diode, and the like. It should be noted that light source 10 may be configured to include one kind of light emitting element, or configured to include plural kinds of light emitting elements according to purposes.

Hereinafter, the light emitting element is, for example, a laser diode that emits near infrared light, or a light emitting diode that emits near infrared light, or the like. However, the irradiation light irradiated by light source 10 may be infrared light (also referred to as infrared ray) of a frequency band other than near infrared light. Hereinafter, in the present embodiment, although the irradiation light irradiated by light source 10 will be described as infrared light, the infrared light may be near infrared light, or infrared light of a frequency band other than that of near infrared light.

Solid-state imaging element 20 images a subject and outputs an imaging signal indicating an exposure amount. To be more specifically, solid-state imaging element 20 performs exposure at a timing indicated by an exposure signal generated in processing circuit 30, and outputs an imaging signal indicating an exposure amount.

Solid-state imaging element 20 has a pixel array in which a first pixel that performs imaging with reflected light, which is irradiation light reflected by a subject, and a second pixel that images the subject are disposed in an array. Solid-state imaging element 20 may have, for example, as needed, cover glass, and a logic function such as an A/D converter, etc.

Hereinafter, as with the irradiation light, description will be made supposing that the reflected light is infrared light. However, the reflected light does not need to be limited to infrared light provided that the light is irradiation light reflected by a subject.

Figure 2:
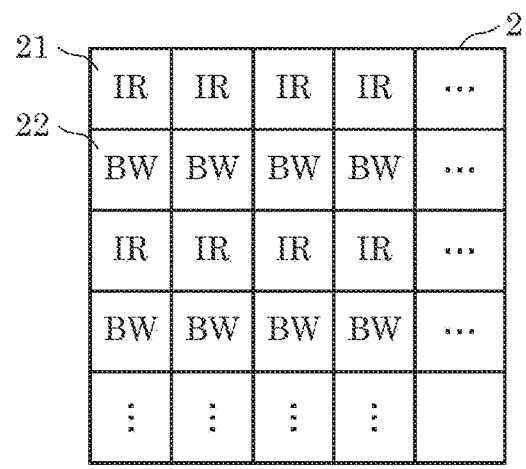
FIG. 2 is a schematic diagram illustrating a pixel array in a solid-state imaging element according to Embodiment.

FIG. 2 is a schematic diagram illustrating pixel array 2 included in solid-state imaging element 20.

As shown in FIG. 2, pixel array 2 is configured to be disposed in an array pattern such that first pixel 21 (IR pixel) that performs imaging with reflected light, which is irradiation light reflected by a subject, and second pixel 22 (BW pixel) that images the subject are alternately aligned in columns.

Moreover, in FIG. 2, although second pixel 22 and first pixel 21 are arranged to be adjacent to each other in the row direction and are disposed to be aligned in a stripe pattern in the row direction, in pixel array 2, this is not limiting and they may be disposed every multiple rows (every two rows, for example). That is, the first row in which second pixels 22 are arranged to be adjacent to each other in the row direction, and the second row in which first pixels 21 are arranged to be adjacent to each other in the row direction may be disposed alternately every M rows (M is a natural number). Further, the first row, in which second pixels 22 are arranged to be adjacent to each other in the row direction, and the second row, in which first pixels 21 are arranged to be adjacent to each other in the row direction, may be disposed every different number of rows (N rows of the first row and L rows of the second row are alternately repeated (N and L are different natural numbers)).

First pixel 21 is implemented by, for example, an infrared light pixel sensitive to infrared light which is the reflected light. Second pixel 22 is implemented by, for example, a visible light pixel sensitive to visible light.

The infrared light pixel is configured to include, for example, an optical filter (also called as an IR filter) which transmits only infrared light, a micro lens, a light receiving element as a photoelectric converter, and an accumulator that accumulates electric charge generated at the light receiving element. Therefore, an image indicating the luminance of infrared light is represented by an imaging signal outputted from a plurality of infrared light pixels (that is, first pixel 21) included in pixel array 2. Hereinafter, this image of infrared light is also referred to as IR image or infrared image.

Moreover, the visible light element is configured to include, for example, an optical filter (also called as a BW filter) which transmits only visible light, a micro lens, a light receiving element as a photoelectric converter, and an accumulator that accumulates electric charge converted at the light receiving element. Therefore, the visible light pixel, that is, second pixel 22, outputs an imaging signal indicating luminance and color difference. That is, a color image that indicates luminance and color difference of visible light is represented by an imaging signal outputted from a plurality of second pixels 22 included in pixel array 2. It should be noted that the optical filter of visible light pixel may transmit both visible light and infrared light, or may transmit only light of a specific wavelength such as red (R), green (G), or blue (B) of visible light.

Moreover, the visible light pixel may detect only the luminance of visible light. In this case, the visible light pixel, that is, second pixel 22, outputs an imaging signal indicating luminance. Therefore, a pixel of black and white that indicates the luminance of visible light, in other words, a monochrome image is represented by an imaging signal outputted from a plurality of second pixels 22 included in pixel array 2. This monochrome image is hereinafter referred to as a BW image. It should be noted that the above-described color image and the BW image are collectively referred to as a visible light image.

Referring back to FIG. 1 again, description of depth acquisition device 1 will be continued.

Processing circuit 30 computes subject information relating to a subject by using the imaging signal outputted by solid-state imaging element 20.

Processing circuit 30 is constituted by, for example, an arithmetic processing unit such as a microcomputer. The microcomputer includes a processor (microprocessor), a memory, etc. and generates a light emitting signal and an exposure signal by the processor executing a driving program stored in the memory. It should be noted that processing circuit 30 may use PGA or ISP, etc. and may be constituted by one hardware or multiple hardware.

Processing circuit 30 calculates distance to a subject by, for example, a TOF distance measurement method which is performed by using the imaging signal from first pixel 21 of solid-state imaging element 20.

Hereinafter, referring to the drawings, calculation of distance to a subject by the TOF distance measurement method performed by processing circuit 30 will be described.

Figure 3:
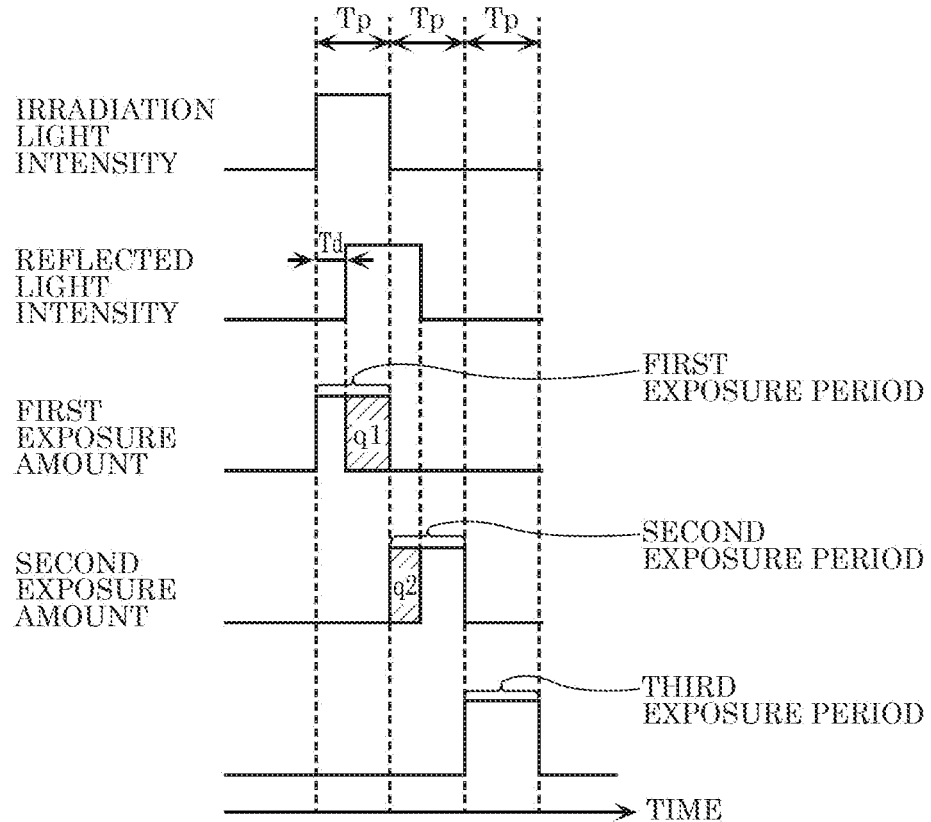
FIG. 3 is a time chart illustrating a light emitting timing of a light emitting element of a light source and exposure timings of a first pixel in the solid-stage imaging element according to Embodiment.

FIG. 3 is a time chart illustrating a relationship between the light emitting timing of the light emitting element of light source 10 and the exposure timing of first pixel 21 of solid-state imaging element 20 when processing circuit 30 calculates a distance to a subject by using the TOF distance measurement method.

In FIG. 3, Tp is a light emission period during which a light emitting element of light source 10 emits irradiation light, and Td is a delay time from when the light emitting element of light source 10 emits the irradiation light until when reflected light which is the irradiation light reflected by a subject returns to solid-state imaging element 20. And the first exposure period is at the same timing at that of the light emission period during which light source 10 emits irradiation light, and the second exposure period is timing from the end time point of the first exposure period until an elapse of the light emission period Tp.

In FIG. 3, q1 indicates a total amount of exposure amount in first pixel 21 of solid-state imaging element 20 by the reflected light in the first exposure period, and q2 indicates a total amount of exposure amount in first pixel 21 of solid-state imaging element 20 by the reflected light in the second exposure period.

By performing light emission of irradiation light by the light emitting element of light source 10 and exposure by first pixel 21 of solid-state imaging element 20 at a timing shown in FIG. 3, it is possible to represent a distance d to a subject by the following (Equation 1) with c as the speed of light.

$$d = c \times Tp/2 \times q2/(q1+q2) \quad \text{(Equation 1)}$$

Therefore, processing circuit 30 can calculate the distance to a subject by using an imaging signal from first pixel 21 of solid-state imaging element 20 by using (Equation 1).

Further, a plurality of first pixels 21 of solid-state imaging element 20 may be exposed for a third exposure period Tp after the end of the first exposure period and the second exposure period. The plurality of first pixels 21 can detect noises other than reflected light by the exposure amount obtained in the third exposure period Tp. That is, processing circuit 30 can more accurately calculate the distance d to a subject by deleting noises respectively from exposure amount q1 in the first exposure period and exposure amount q2 in the second exposure period, in the above-described (Equation 1).

Referring back to FIG. 1 again, description of depth acquisition device 1 will be continued.

Processing circuit 30 may perform detection of a subject, and calculation of the distance to the subject by using imaging signals from, for example, second pixel 22 of solid-state imaging element 20.

That is, processing circuit 30 may perform detection of a subject and calculation of a distance to the subject based on visible light image imaged by a plurality of second pixels 22 of solid-state imaging element 20. Here, the detection of a subject may be implemented by, for example, performing discrimination of shape by pattern recognition through edge detection of a singular point of the subject, or may be implemented by processing such as Deep Learning by using a learning model trained in advance. Further, calculation of a distance to the subject may be performed by using global coordinate transformation. As a matter of course, detection of a subject may be implemented by multi-modal learning process by using not only visible light image, but also luminance and distance information of infrared light imaged by first pixel 21.

Processing circuit 30 generates a light emission signal indicating the timing of light emission, and an exposure signal indicating the timing of exposure. Then, processing circuit 30 outputs the generated light emission signal to light source 10, and outputs the generated exposure signal to solid-state imaging element 20.

Processing circuit 30 may make depth acquisition device 1 implement continuous imaging at a predetermined frame rate, for example, by generating and outputting a light emission signal so as to make light source 10 emit light on a predetermined cycle, and generating and outputting an exposure signal so as to expose solid-state imaging element 20 on a predetermined cycle. Moreover, processing circuit 30 includes, for example, a processor (microprocessor), a memory, and the like, and a light emission signal and an exposure signal are generated by the processor executing driving program stored in the memory.

Diffusion plate 50 adjusts the intensity distribution and the angle of irradiation light. Moreover, in the adjustment of the intensity distribution, diffusion plate 50 makes the intensity distribution of irradiation light from light source 10 uniform. It should be noted that in the example shown in FIG. 1, depth acquisition device 1 includes diffusion plate 50; however, this diffusion plate 50 may not be included.

Lens 60 is an optical lens that collects light entering from the outside of depth acquisition device 1 on the surface of pixel array 2 of solid-state imaging element 20.

Band-pass filter 70 is an optical filter that transmits infrared light which is reflected light and visible light. It should be noted that in an example shown in FIG. 1, depth acquisition device 1 includes band-pass filter 70; however, this band-pass filter 70 may not be included.

Depth acquisition device 1 of the above-described configuration is used by being installed on a transport equipment. For example, depth acquisition device 1 is used by being installed on a vehicle that travels on the road surface. It should be noted that the transport equipment on which depth acquisition device 1 is installed does not need to be limited to a vehicle. Depth acquisition device 1 may be used by being installed on a transport equipment other than vehicles, such as motorcycles, boats, air planes, and the like.

[Outline of Depth Acquisition Device]

Depth acquisition device 1 in the present embodiment acquires an IR image and a BW image with hardware configuration shown in FIG. 1 by imaging of a substantially same scene, the imaging being performed at a substantially same viewpoint and a same time. And depth acquisition device 1 corrects the depth at each position in the IR image obtained from that IR image by using the BW image. Specifically, when a below described flare region exists in an IR image, depth acquisition device 1 corrects the depth at each position in the flare region obtained from that IR image by using the image in the region of the BW image corresponding to the flare region.

Figure 4:
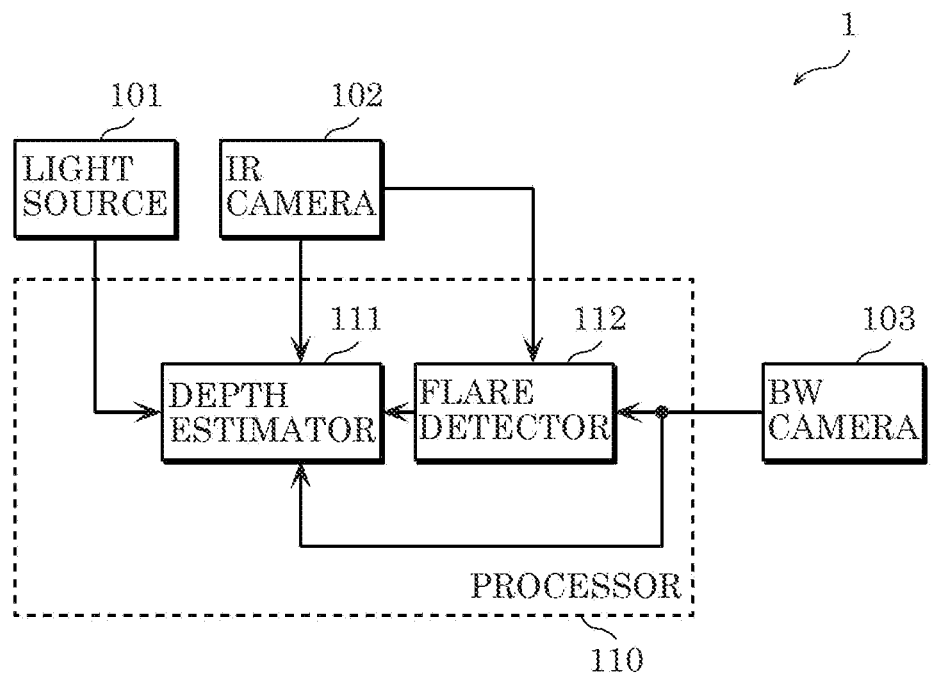
FIG. 4 is a block diagram illustrating an example of a functional structure of the depth acquisition device according to Embodiment.

FIG. 4 is a block diagram illustrating an example of a functional structure of depth acquisition device 1.

Depth acquisition device 1 includes light source 101, IR camera 102, BW camera 103, depth estimator 111, and flare detector 112.

Light source 101 may be constituted by light source 10 and diffusion plate 50 shown in FIG. 1.

IR camera 102 may be constituted by a plurality of first pixels 21 of solid-state imaging element 20, lens 60, and band-pass filter 70 shown in FIG. 1. Such IR camera 102 acquires an IR image by performing imaging of a scene including the subject with infrared light according to timing at which light source 101 irradiates infrared light to the subject.

BW camera 103 may be constituted by a plurality of second pixels 22 of solid-state imaging element 20, lens 60, and band-pass filter 70 shown in FIG. 1. Such BW camera 103 acquires a visible light image (specifically, a BW image) by imaging of a substantially same scene as that of the infrared image, the imaging being performed with visible light at a substantially same viewpoint and imaging time as those of the infrared image.

Depth estimator 111 and flare detector 112 may be implemented as a function of processing circuit 30 shown in FIG. 1, specifically as a function of processor 110.

Flare detector 112 detects a flare region from an IR image based on an IR image obtained by imaging by IR camera 102, and a BW image obtained by imaging by BW camera 103.

A flare region in the present embodiment is a region where flare, ghost, saturation of luminance, or smear has occurred. Flare is a fogging phenomenon of light which occurs by adverse light being reflected by the lens surface or the barrel when the lens of IR camera 102 is pointed in a direction of a strong light source. Moreover, flare makes an image whitish and deprives its sharpness. Ghost is a kind of flare in which light that is repeatedly reflected in a complicated manner on the lens surface is clearly reflected as an image. Smear is a phenomenon in which a linear white portion occurs when a subject with a brightness difference from the surroundings of not less than a predetermined value is photographed by the camera.

It should be noted that in the present disclosure, a phenomenon that includes at least one of flare, ghost, saturation of luminance, and smear is referred to as flare and the like.

Depth estimator 111 estimates a depth at each position in the IR image including a flare region detected by flare detector 112. Specifically, depth estimator 111 acquires an IR image obtained by imaging by IR camera 102 according to irradiation timing of infrared light to a subject by light source 101, and based on the IR image, depth at each position in the IR image is estimated. Further, depth estimator 111 corrects the depth at each position estimated in the flare region detected by flare detector 112, based on the BW image. That is, depth estimator 111 estimates a depth of the flare region based on the IR image, the BW image, and the flare region.

Figure 5:
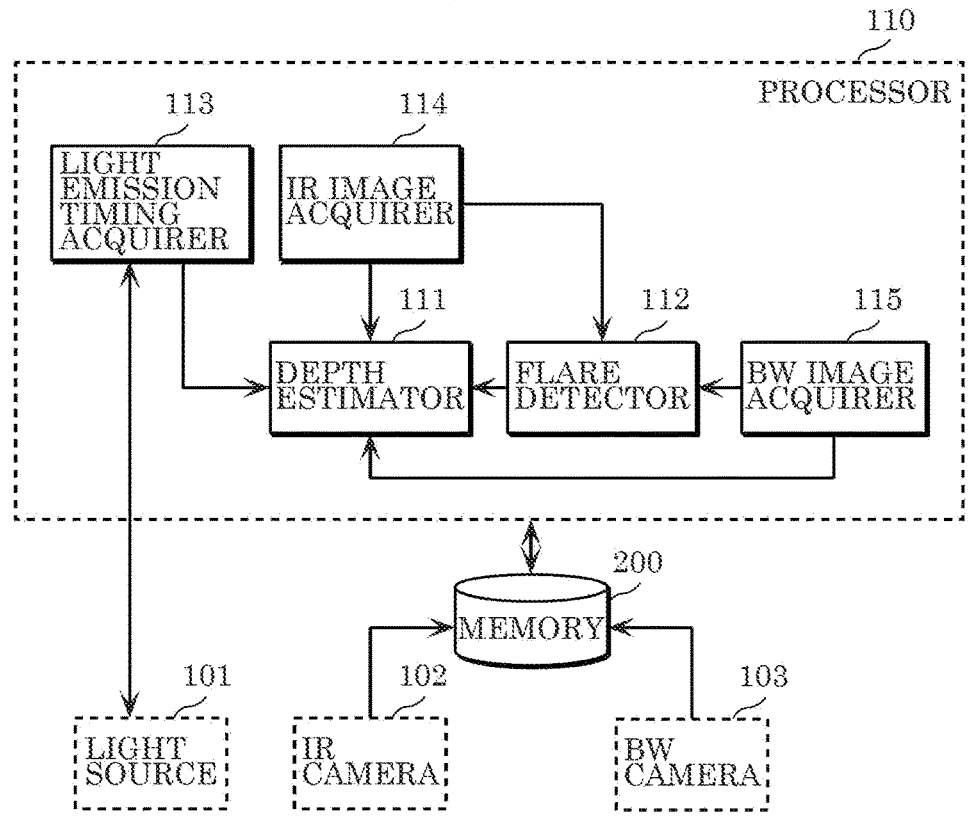
FIG. 5 is a block diagram illustrating another example of a functional structure of the depth acquisition device according to Embodiment.

FIG. 5 is a block diagram illustrating another example of a functional structure of depth acquisition device 1.

Depth acquisition device 1 may include memory 200 and processor 110.

Moreover, processor 110 may not only include depth estimator 111 and flare detector 112, may but also include light emission timing acquirer 113, IR image acquirer 114, and BW image acquirer 115. It should be noted that these components are implemented respectively as a function of processor 110.

Light emission timing acquirer 113 acquires timing information indicating a timing at which light source 101 irradiates infrared light to a subject. That is, light emission timing acquirer 113 outputs the light emission signal shown in FIG. 1 to light source 101, and thereby acquires information indicating the timing of the output as the above-described timing information.

IR image acquirer 114 acquires an IR image which is retained in memory 200, the IR image being obtained by imaging of a scene including a subject with infrared light according to the timing indicated by the timing information.

BW image acquirer 115 acquires a BW image retained in memory 200, in which the BW image is obtained by imaging of a substantially same scene as that of the above-described IR image with visible light, the imaging being performed at a substantially same viewpoint and imaging time as those of the IR image.

Flare detector 112 detects, as described above, a flare region from an IR image, and depth estimator 111 estimates a depth based on the IR image, the BW image, and the flare region.

It should be noted that depth acquisition device 1 in the present Embodiment may be constituted by processor 110 and memory 200 without including light source 101, IR camera 102, and BW camera 103.

Figure 6:
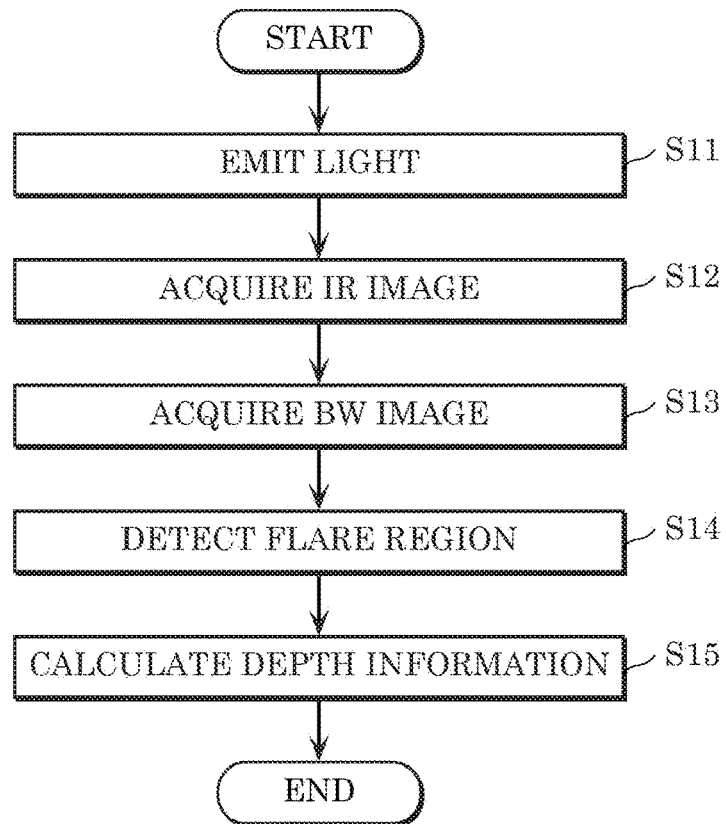
FIG. 6 is a flowchart illustrating overall processing operation of the depth acquisition device according to Embodiment.

FIG. 6 is a flowchart illustrating overall processing operation of depth acquisition device 1.

(Step S11)

First, light source 101 emits light, and thereby irradiates infrared light to a subject.

(Step S12)

Next, IR camera 102 acquires an IR image. That is, IR camera 102 images a scene including a subject which is irradiated with infrared light by light source 101. In this way, IR camera 102 acquires an IR image based on infrared light reflected from the subject. Specifically, IR camera 102 acquires IR images obtained at respective timings and by exposure amounts of the first exposure period, the second exposure period, and the third exposure period shown in FIG. 3.

(Step S13)

Next, BW camera 103 acquires a BW image. That is, BW camera 103 acquires a BW image corresponding to the IR image acquired in step S12, that is, a BW image of the same scene and the viewpoint as those of the IR image.

(Step S14)

Then, flare detector 112 detects a flare region from the IR image acquired in step S12.

(Step S15)

Next, depth estimator 111 estimates a depth of the flare region based on the IR image acquired in step S12, the BW image acquired in step S13, and the flare region detected in step S14.

Figure 7:
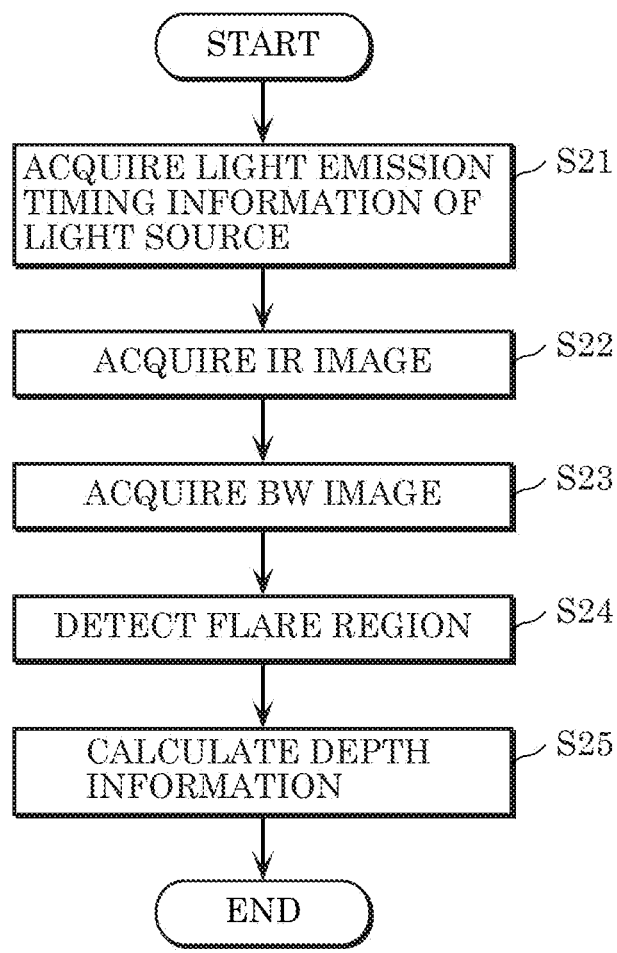
FIG. 7 is a flowchart illustrating overall processing operation by a processor of the depth acquisition device according to Embodiment.

FIG. 7 is a flowchart illustrating overall processing operation by processor 110 of depth acquisition device 1.

(Step S21)

First, light emission timing acquirer 113 of processor 110 acquires timing information indicating the timing at which light source 101 irradiates infrared light to a subject.

(Step S22)

Next, IR image acquirer 114 acquires an IR image from IR camera 102 that has performed imaging according to the timing indicated by the timing information acquired in step S21. For example, IR image acquirer 114 outputs an exposure signal to IR camera 102 at the timing at which the light emission signal shown in FIG. 1 is outputted from light emission timing acquirer 113. In this way, IR image acquirer 114 causes IR camera 102 to start imaging, and acquires the IR image obtained by the imaging from IR camera 102. At this moment, IR image acquirer 114 may acquire an IR image from IR camera 102 via memory 200, or directly from IR camera 102.

(Step S23)

Next, BW image acquirer 115 acquires a BW image corresponding to the IR image acquired in step S22 from BW camera 103. At this moment, BW image acquirer 115 may acquire the BW image from BW camera 103 via memory 200, or directly from BW camera 103.

(Step S24)

Then, flare detector 112 detects a flare region from the IR image.

(Step S25)

Next, depth estimator 111 estimates a depth of a flare region based on the IR image acquired in step S22, the BW image acquired in step S23, and the flare region detected in step S24. As a result of this, depth information which at least indicates a depth of the flare region is calculated. It should be noted that at this moment, depth estimator 111 may estimate depth of not only the flare region but also the entire IR image, and calculate depth information indicating the estimation result.

Specifically, depth estimator 111 in the present embodiment estimates, from the IR image acquired in step S22, a depth at each position in the IR image. Then, depth estimator 111 corrects the depth at each position in the flare region by using the BW image. It should be noted that the each position may be respective positions of a plurality of pixels, or a position of a block consisting of a plurality of pixels.

In such depth acquisition device 1 in the present embodiment, since a flare region is detected from an IR image, and in that flare region, depth is estimated based on not only the IR image but also the BW image, it is possible to appropriately acquire the depth of the flare region. That is, the scene to be imaged is substantially the same between the IR image and the BW image, and the viewpoint and the imaging time are also substantially the same. Therefore, the IR image and the BW image have high correlation. Moreover, flare and the like are a phenomenon which is dependent on wavelength, and even if flare and the like occur in an IR image, it is highly likely that flare and the like do not occur in the BW image. Therefore, it is possible to supplement information lacking in a flare region from a region (that is, corresponding region) in the BW image corresponding the flare region. Consequently, it is possible to appropriately acquire the depth of the flare region.

[Specific Functional Structure of Depth Acquisition Device]

Figure 8:
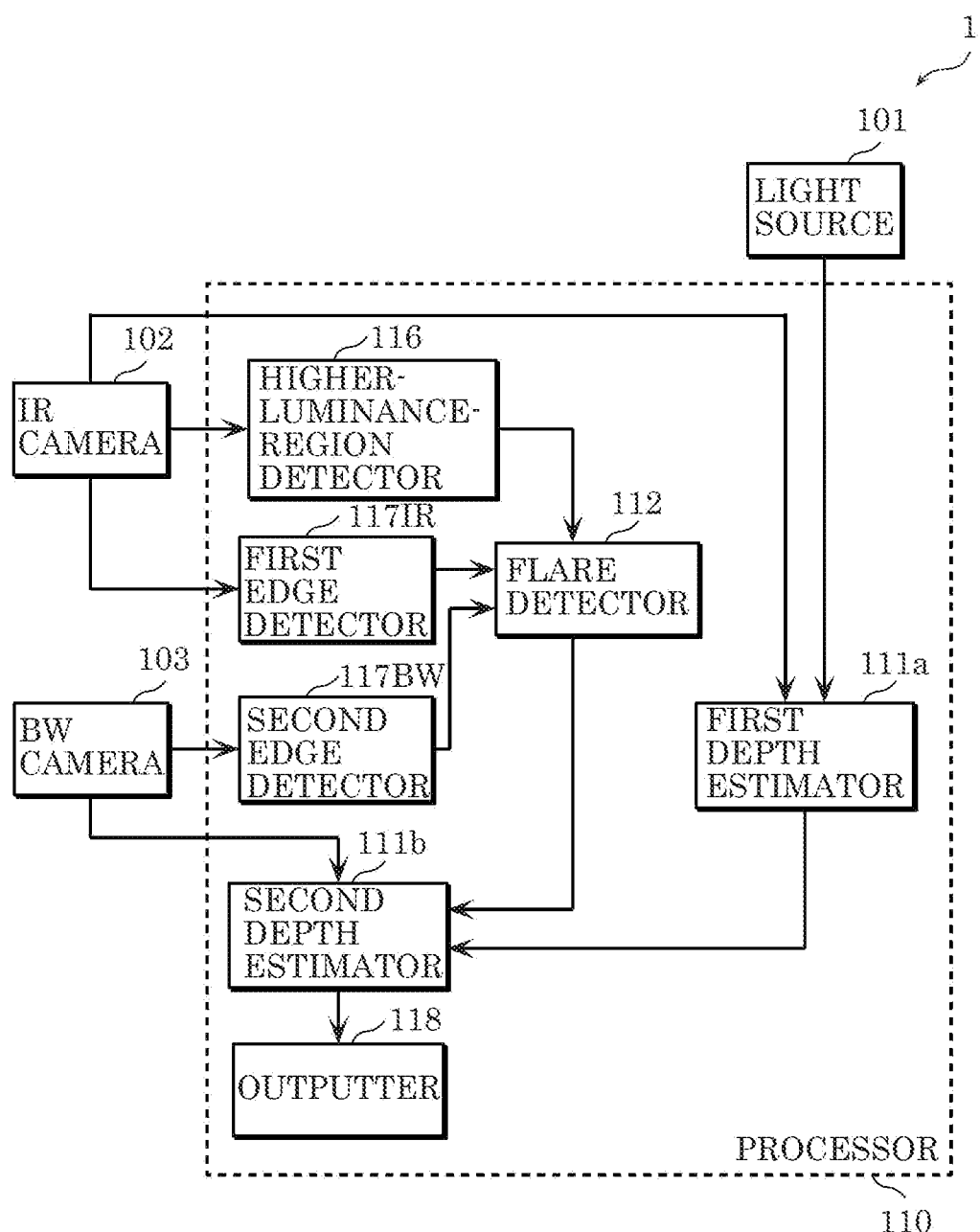
FIG. 8 is a block diagram illustrating a functional structure of the processor of the depth acquisition device according to Embodiment.

FIG. 8 is a block diagram illustrating a specific functional structure of processor 110 of depth acquisition device 1.

Processor 110 includes first depth estimator 111a, second depth estimator 111b, flare detector 112, higher-luminance-region detector 116, first edge detector 117IR, second edge detector 117BW, and outputter 118. It should be noted that first depth estimator 111a and second depth estimator 111b correspond to depth estimator 111 shown in FIG. 5. Moreover, processor 110 may include the above-described light emission timing acquirer 113, IR image acquirer 114, and BW image acquirer 115.

Higher-luminance-region detector 116 detects a region having a luminance not less than first threshold in an IR image, as a higher luminance region. First edge detector 117IR detects an edge in an IR image. Second edge detector 117BW detects an edge in a BW image.

For each of one or more higher luminance regions in an IR image, flare detector 112 compares the edge detected for the higher luminance region with the edge detected for a region in the BW image corresponding to the higher luminance region. Based on this comparison, flare detector 112 determines whether or not the higher luminance region is a flare region. That is, by this determination, a flare region is detected. In other words, flare detector 112 performs regional segmentation of an IR image by discriminating the imaged IR image into a flare region and a non-flare region which is not a flare region.

Here, flare and the like are a phenomenon which is dependent on the wavelength of light. For that reason, flare and the like that have occurred in an IR image do not often occur in a BW image. Generally, the IR image and the BW image are known to have strong correlation. However, in flare and the like which have occurred in an IR image, since edges of the IR image are collapsed, a correlation value between an edge in the region where flare and the like have occurred and an edge in a region of the BW image corresponding to that region will become lower. Further, when flare and the like have occurred, the luminance of the region where they have occurred will become higher. Accordingly, taking advantage of this relationship, flare detector 112 in the present embodiment discriminates a flare region from an imaged IR image.

That is, flare detector 112 in the present embodiment detects, as the flare region, a region which has a luminance of not less than a first threshold and satisfies a predetermined condition, in an IR image. The predetermined condition is a condition at which a correlation value between an image feature amount in a region of the IR image and an image feature amount in a region of the BW image corresponding to that region is less than a second threshold. Here, the image feature amount in each region of the IR image and the BW image is an edge included in the image within the region. It should be noted that the region of the BW image corresponding to the region of the IR image is a region which is located at the spatially same position as the region of the IR image, and which has the same shape and size as those of the region of the IR image.

As described above, the correlation between an image feature amount in the flare region of the IR image and an image feature amount in a region of the BW image corresponding to the flare region tends to be lower. Therefore, it is possible to more appropriately detect a flare region by detecting, as the flare region, a region having a higher luminance and lower correlation of the image feature amount in the IR image.

First depth estimator 111a and second depth estimator 111b have a function as the above-described depth estimator 111.

First depth estimator 111a estimates, based on an IR image acquired according to the timing of irradiation of infrared light by light source 101, a depth at each position in the IR image. First depth estimator 111a outputs the information indicating the estimated depth at each position in the IR image, as the first depth information. That is, first depth estimator 111a estimates first depth information which indicates the depth at each position in the IR image.

Second depth estimator 111b corrects the first depth information based on the BW image and the flare region in the IR image. As a result of this, in the depth at each position in the IR image indicated by the first depth information, the depth of the flare region is corrected. Second depth estimator 111b outputs information indicating a corrected depth at each position in the flare region as the second depth information. That is, second depth estimator 111b estimates the second depth information indicating corrected depth at each position in the flare region by correcting depth at each position in the flare region indicated by the first depth information based on the BW image.

Outputter 118 replaces a depth at each position in the flare region indicated by the first depth information with a corrected depth at each position in the flare region indicated by the second depth information. As a result of this, third depth information is generated, which includes a depth at each position in the region other than the flare region of the IR image indicated by the first depth information, and a corrected depth at each position in the flare region of the IR image indicated by the second depth information. Outputter 118 outputs the third depth information.

As a result of this, the third depth information indicates a depth obtained from an IR image as the depth outside the flare region of the IR image, and indicates a depth obtained from the IR image and corrected based on the BW image as the depth of the flare region of the IR image. Therefore, in the present embodiment, even when there is a flare region in the IR image, it is possible to appropriately estimate the depth of the entire IR image.

Figure 9A:
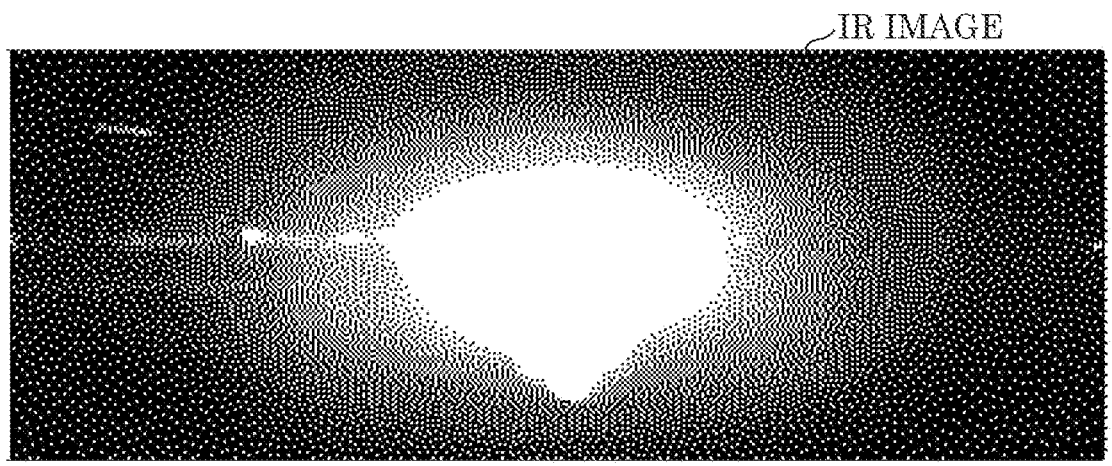
FIG. 9A is a diagram illustrating an example of an IR image.
Figure 9B:
FIG. 9B is a diagram illustrating an example of a BW image.

FIG. 9A shows an example of IR image. FIG. 9B shows an example of BW image.

As shown in FIG. 9B, in a BW image, a scene in which a signboard is disposed on the road is shown. The signboard includes, for example, a material that easily reflects infrared light. Accordingly, if IR camera 102 images the same scene as the scene shown in FIG. 9B from the same viewpoint as the viewpoint of BW camera 103, the IR image shown in FIG. 9A is acquired.

In the IR image acquired as described above, as shown in FIG. 9A, a flare of a higher luminance has occurred in a region including a range corresponding to the signboard of the BW image. This is because, as a result of the infrared light from light source 101 being specularly reflected on the signboard of the road, infrared light with a high intensity comes incident on IR camera 102 as the reflected light. It should be noted that materials that easily reflect infrared light are often used for clothes worn by construction workers, or multiple poles standing along the road and the like. Therefore, when such a scene including a subject using such material is imaged, it is highly likely that flare and the like occur in the IR image. However, it is less likely that flare and the like occur in the BW image. Consequently, the correlation between the image feature amount of the flare region of the IR image and the image feature amount of the region of the BW image corresponding to that flare region will become lower. On the other hand, correlation between the image feature amount of a region other than the flare region (that is, non-flare region) of the IR image and the image feature amount of the region of the BW image corresponding to the non-flare region will become higher.

Figure 10:
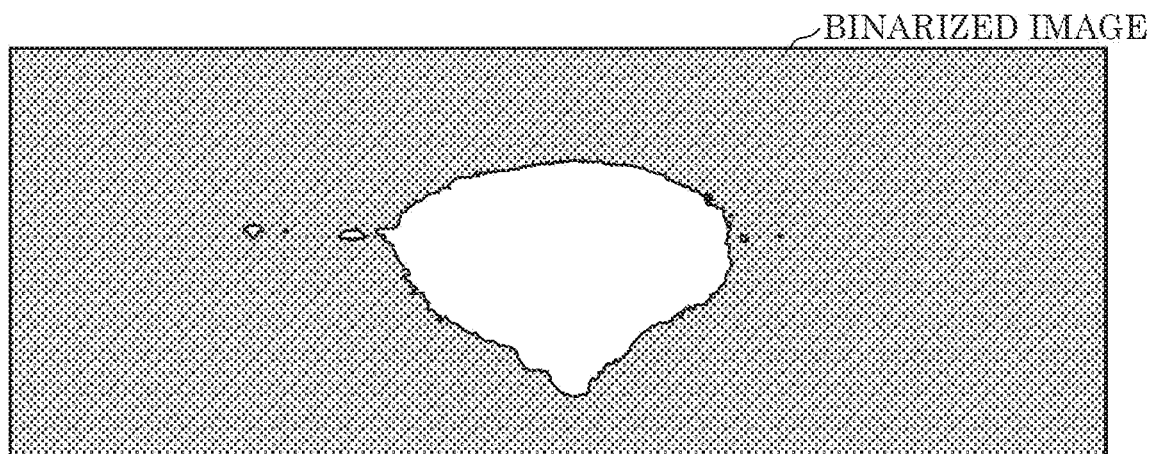
FIG. 10 is a diagram illustrating an example of a binarized image to be obtained by binarization of IR image.

FIG. 10 shows an example of binarized image obtained by binarization of an IR image.

Higher-luminance-region detector 116 detects, in the IR image shown in FIG. 9A, a region having a luminance of not less than a first threshold as a higher luminance region. That is, higher-luminance-region detector 116 binarizes the luminance at each position (that is, at each pixel) in the IR image. Consequently, for example, as shown in FIG. 10, a binarized image consisting of white regions and black regions (hatched region in FIG. 10) is generated.

Figure 11:
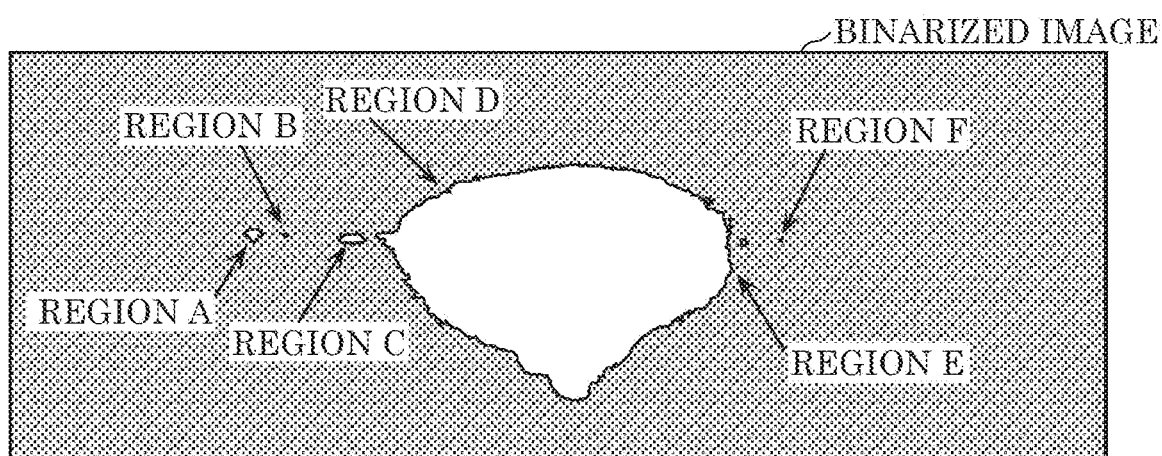
FIG. 11 is a diagram illustrating an example of a higher luminance region in an IR image.

FIG. 11 shows an example of higher luminance region in an IR image.

Higher-luminance-region detector 116 detects a white region in a binarized image as the higher luminance region. For example, as shown in FIG. 11, when six white regions are included in a binarized image, higher-luminance-region detector 116 detects six white regions as higher luminance regions A to F. That is, an IR image or a binarized image is regionally segmented into six higher luminance regions A to F and a non-higher luminance region which is not a higher luminance region.

Figure 12:
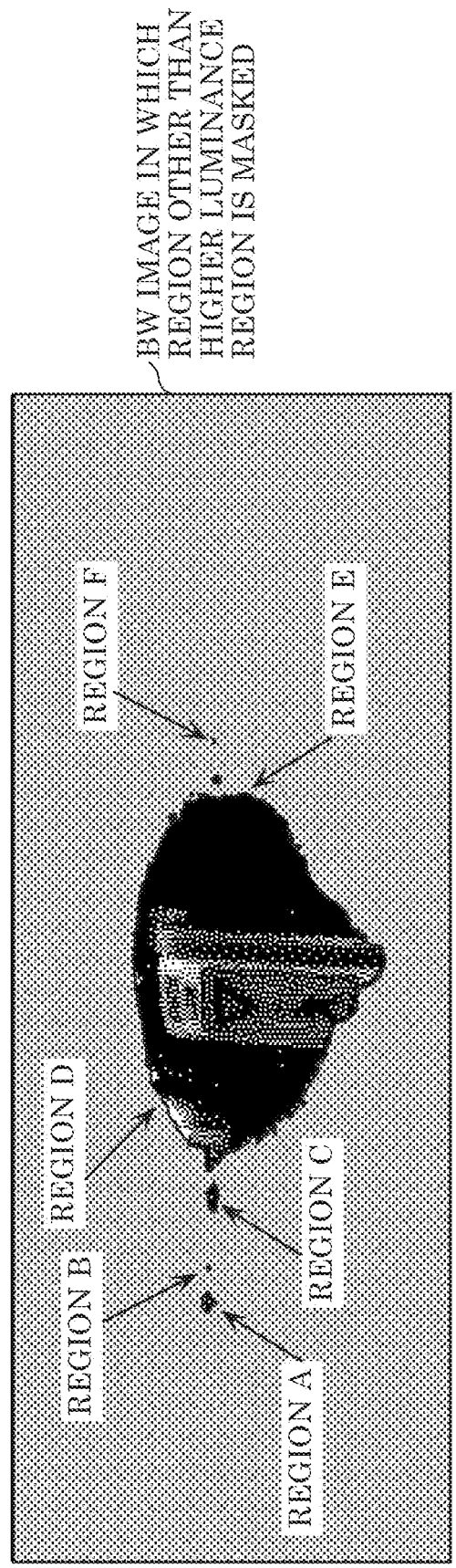
FIG. 12 is a diagram illustrating a region of BW image corresponding to a higher luminance region of IR image.

FIG. 12 shows a region of the BW image corresponding to a higher luminance region of the IR image.

For each of one or more higher luminance regions in a binarized image (that is, IR image), flare detector 112 specifies image feature amounts of a region in a BW image corresponding to the higher luminance region. It should be noted that the image feature amount is, for example, an edge. Moreover, the region in the BW image corresponding to the higher luminance region is located at the spatially same position as the higher luminance region in a binarized image or an IR image, and has the same shape and size as those of higher-luminance region. Hereinafter, a region in the BW region corresponding to such region of the IR image is also referred to as a corresponding region.

For example, when higher luminance regions A to F are detected as shown in FIG. 11, flare detector 112 determines image feature amounts of regions corresponding to each of these higher luminance regions A to F in the BW image.

Figure 13:
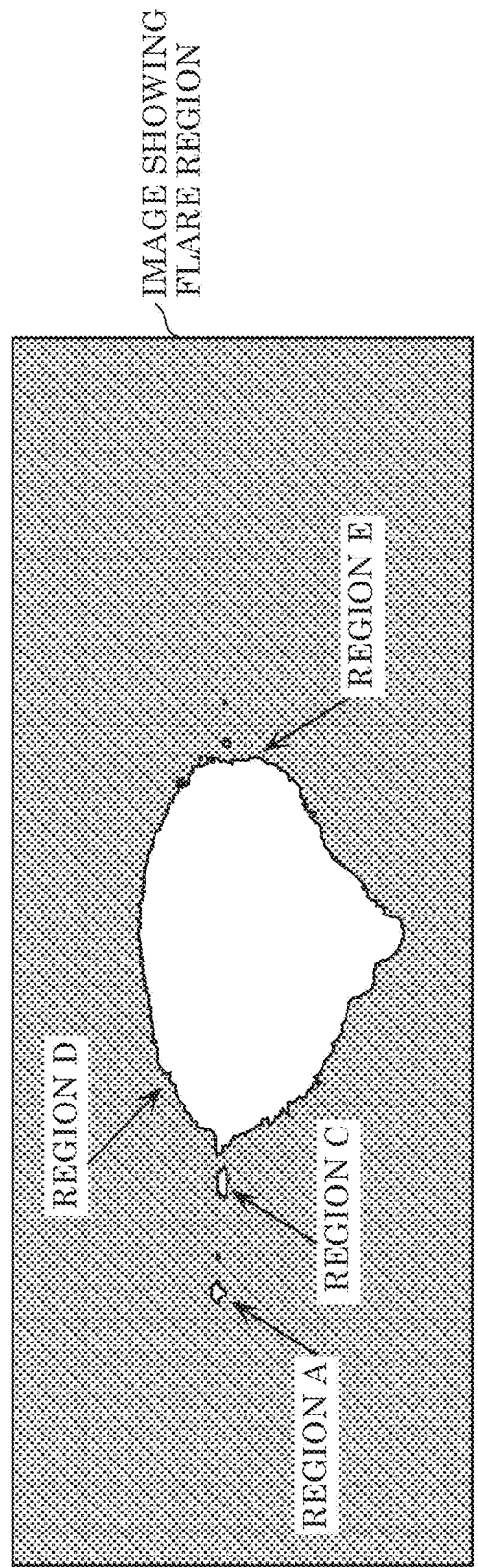
FIG. 13 is a diagram illustrating an example of a flare region detected from an IR image.

FIG. 13 shows an example of flare regions detected from an IR image.

For each of higher luminance regions A to F, flare detector 112 determines whether or not the higher luminance region is a flare region. That is, flare detector 112 determines whether or not the higher luminance region is a flare region by comparing the image feature amount of higher luminance region A in the IR image with the image feature amount of a corresponding region in the BW image corresponding to that higher luminance region A. Consequently, for example as shown in FIG. 13, flare detector 112 determines that higher luminance regions A, C, D, and E among higher luminance regions A to F are flare regions.

Figure 14:
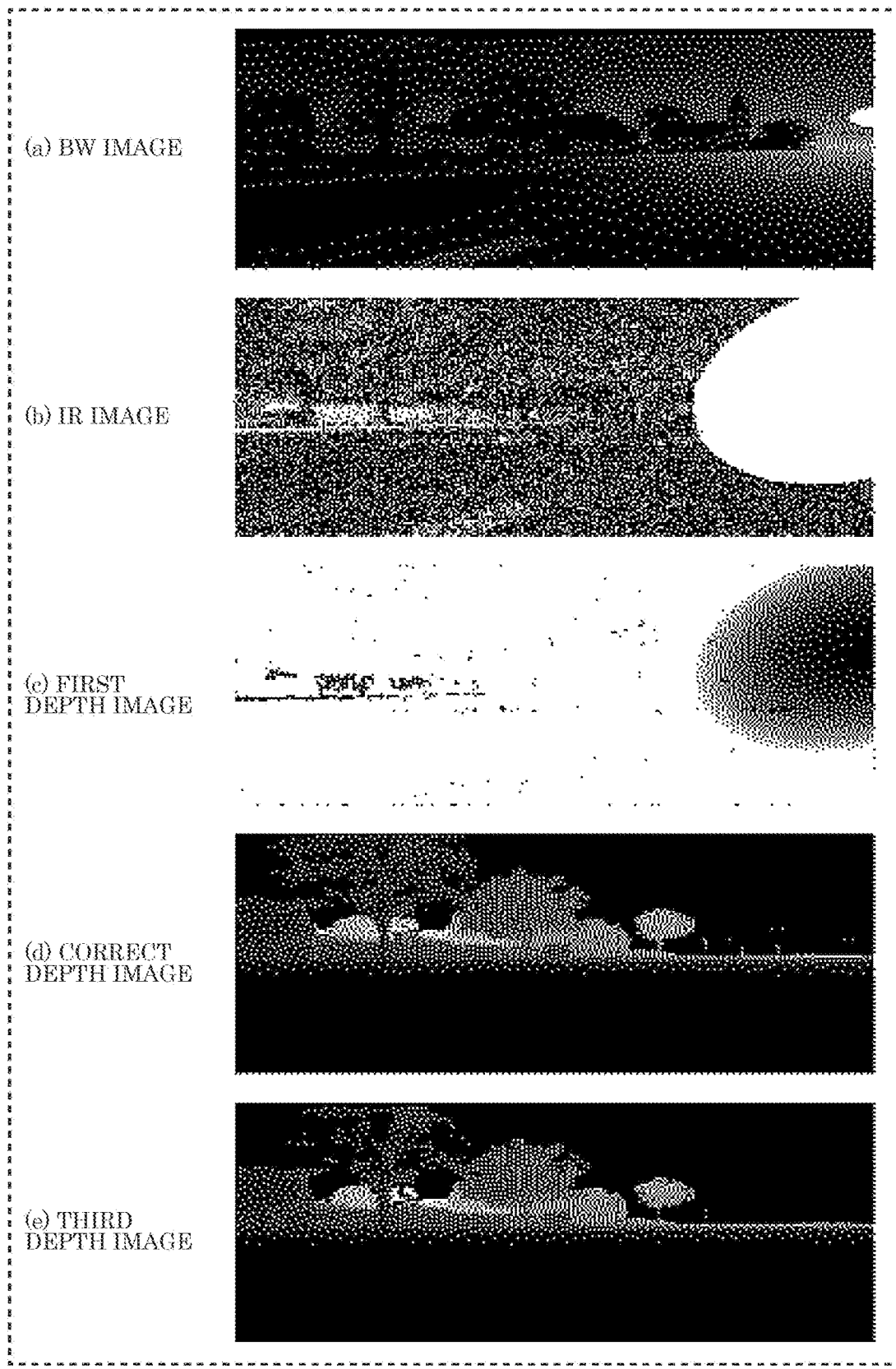
FIG. 14 is a diagram illustrating a simulation result of the depth acquisition device according to Embodiment.

FIG. 14 shows a simulation result of depth acquisition device 1.

Depth acquisition device 1 acquires a BW image shown in (a) of FIG. 14 by imaging with BW camera 103, and further acquires an IR image shown in (b) of FIG. 14 by imaging with IR camera 102. These BW image and IR image are images which are obtained by imaging the same scene at the same viewpoint and imaging time. In the example shown in (b) of FIG. 14, a large flare region has occurred at the right end of the IR image.

First depth estimator 111a generates first depth information shown in (c) of FIG. 14 by estimating a depth from the IR image. This first depth information is represented as a first depth image in which the depth at each position in the IR image is indicated by luminance. In this first depth image, the depth of the flare region is inappropriately represented.

Second depth estimator 111b corrects the inappropriate depth in the flare region. Then, outputter 118 generates third depth information indicating the corrected depth of the flare region and the depth of non-flare region, as shown in (e) of FIG. 14. Like the first depth information, this third depth information is also represented as a third depth image in which depth is indicated with luminance. It should be noted that second depth estimator 111b may also correct the depth of the non-flare region in the first depth image based on the image feature amount of the corresponding region of the BW image.

In this way, in depth acquisition device 1 in the present embodiment, it is possible to bring the third depth image closer to the correct depth image shown in (d) of FIG. 14 in the entire image including a flare region.

[Specific Processing Flow of Depth Acquisition Device]

Figure 15:
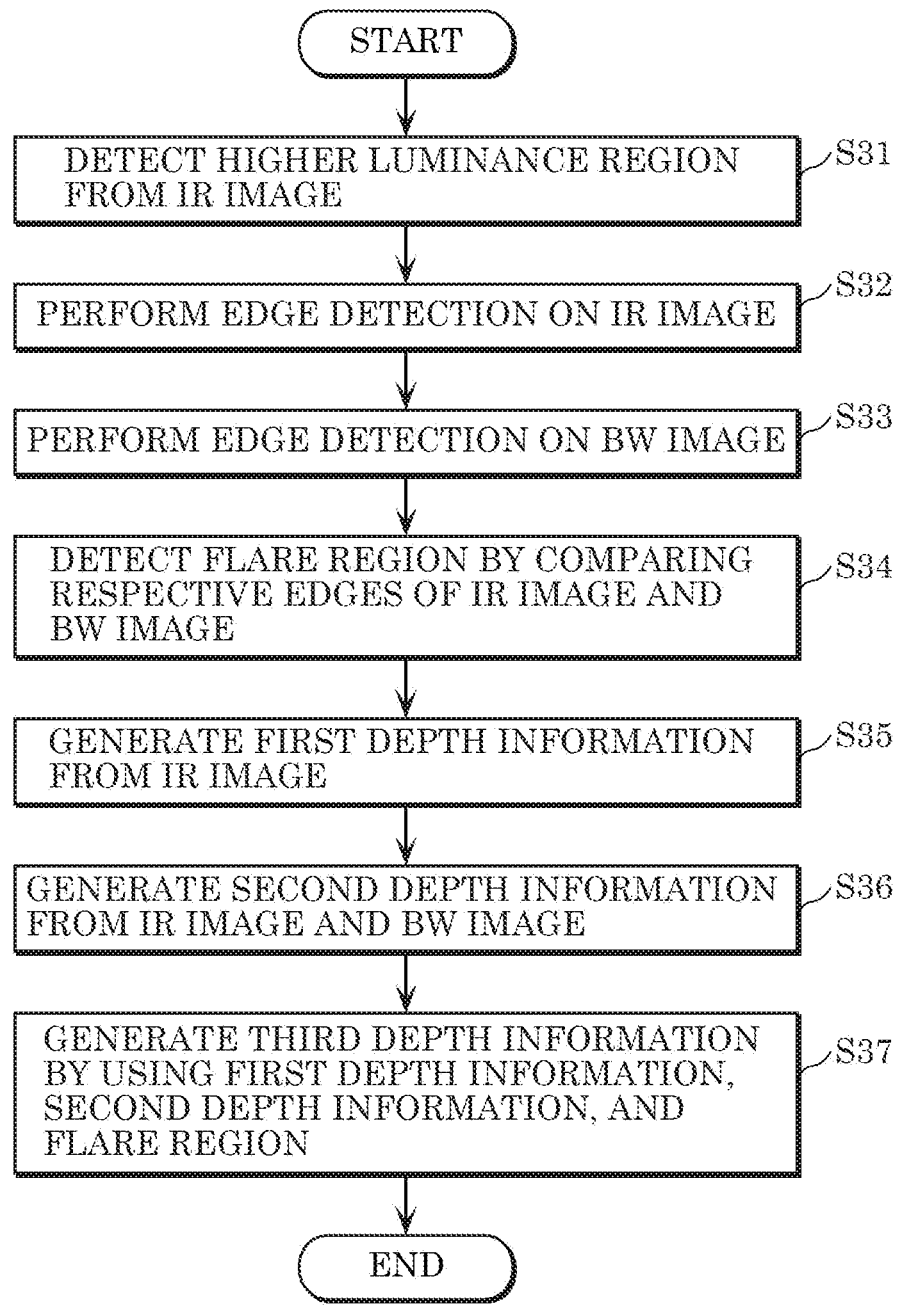
FIG. 15 is a flowchart illustrating overall processing operation of the depth acquisition device shown in FIG. 8.

FIG. 15 is a flowchart illustrating overall processing operation of depth acquisition device 1 shown in FIG. 8.

(Step S31)
First, higher-luminance-region detector 116 detects a higher luminance region from an IR image.
(Step S32)
First edge detector 117IR detects an edge which is present in the IR image.
(Step S33)
Second edge detector 117BW detects an edge which is present in the BW image.
(Step S34)
For each of one or more higher luminance regions of an IR image, flare detector 112 detects a flare region in the IR image by comparing an edge in the higher luminance region with an edge in a corresponding region of the BW image. That is, when a correlation value between an edge in the higher luminance region and an edge in the corresponding region of the BW image is less than a second threshold, flare detector 112 detects that higher luminance region as the flare region. As a result of this, the IR image is regionally segmented into at least one flare region and a non-flare region.
(Step S35)
First depth estimator 111a generates first depth information from an IR image by using, for example, TOF.
(Step S36)
Second depth estimator 111b generates second depth information indicating the depth of a flare region based on the first depth information of the IR image and the BW image.
(Step S37)
Outputter 118 generates third depth information by replacing the depth of a flare region indicated by the first depth information with the depth indicated by the second depth information.

Figure 16:
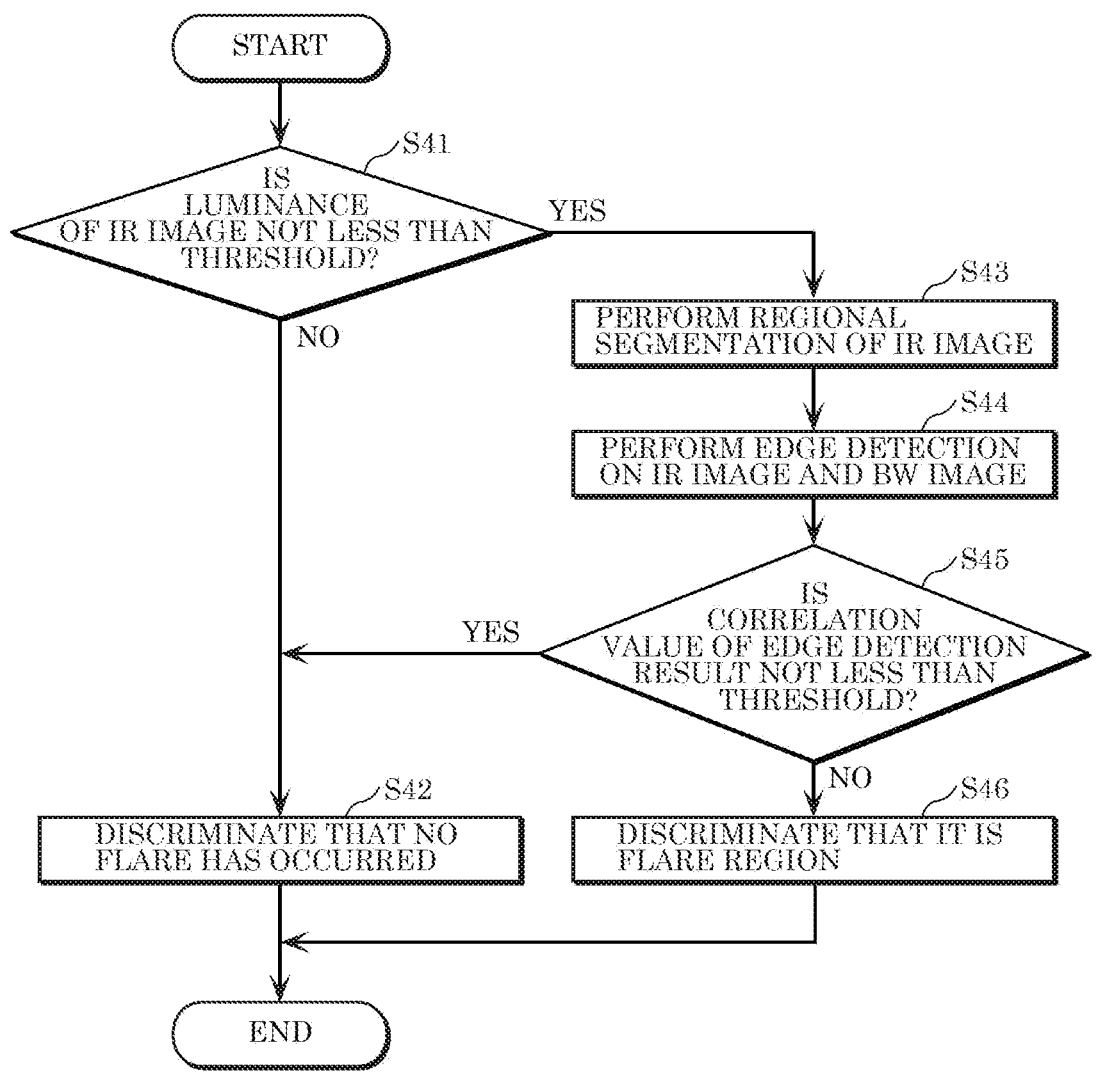
FIG. 16 is a flowchart illustrating detailed processing of steps S31 to S34 of FIG. 15.

FIG. 16 is a flowchart illustrating detailed processing of steps S31 to S34 of FIG. 15.
(Step S41)
First, higher-luminance-region detector 116 determines whether or not the luminance of each position in an IR image is not less than a first threshold. Here, the first threshold may be about 1500 if, for example, the IR image is an image of 12 bit gradation. Of course, this first threshold may be a value that varies according to environmental conditions or settings of IR camera 102. For example, when a dark scene such as night is imaged, since the luminance of the entire IR image will be lower, the first threshold may be a smaller value than that when a bright scene in daytime is imaged. Moreover, when the exposure time of IR camera 102 is long, since the luminance of the entire IR image will be higher, the first threshold may be a larger value than that when the exposure time is short.
(Step S42)
Here, upon determining that luminance at any position is not equal to or greater than the first threshold (No in step S41), higher-luminance-region detector 116 determines that no flare has occurred in the IR image (step S42). That is, the entire IR image is determined to be a non-flare region.
(Step S43)
On the other hand, upon determining that luminance at any one position is not less than the first threshold (Yes in step S41), higher-luminance-region detector 116 performs regional segmentation of the IR image. That is, higher-luminance-region detector 116 segments the IR image into at least one higher luminance region, and a region other than the higher luminance region. For this regional segmentation, for example, a method based on luminance, such as Super Pixel may be used.
(Step S44)
Next, first edge detector 117IR and second edge detector 117BW perform edge detection respectively on an IR image and a BW image. For edge detection, Canny method or Sobel filter, etc. may be used.
(Step S45)
For each of one or more higher luminance regions of an IR image, flare detector 112 compares an edge in the higher luminance region and an edge in the region of a BW image corresponding to the higher luminance region. That is, flare detector 112 determines whether or not a correlation value between the edge in the higher luminance region of the IR image and the edge in the corresponding region of the BW image is not less than a second threshold. The correlation value is obtained by arranging each value, which is outputted by performing edge detection for each of the IR image and the BW image, in a vector shape for each region, and normalizing the inner product value thereof. That is, flare detector 112 normalizes an inner product value between a vector consisting of multiple values obtained by edge detection in a higher luminance region of the IR image, and a vector consisting of multiple values obtained by edge detection in a region of the BW image corresponding to that higher luminance region. As a result of this, the correlation value for a higher luminance region is calculated.
(Step S46)
Here, upon determining that the correlation value is not equal to or greater than the second threshold, that is, is less than the second threshold (No in step S45), flare detector 112 determines that higher luminance region as a flare region. That is, since there is no correlation of edge between a region with flare in the IR image and a corresponding region of the BW image, flare detector 112 discriminates the higher luminance region in the IR image as a flare region.

On the other hand, when determining that the correlation value is not less than the second threshold, that is, not less than the second threshold (Yes in step S45), flare detector 112 determines that flare and the like have not occurred in the higher luminance region. That is, flare detector 112 determines that higher luminance region to be a non-flare region.

In this method, an IR image and a BW image from a substantially same viewpoint position are needed. In depth acquisition device 1 in the present embodiment, for each pixel, a filter to be used for the pixel is set for either an IR filter or a BW filter. That is, as shown in FIG. 2, first pixel 21 having an IR filter, and second pixel 22 having a BW filter are alternately arranged in a column direction. Since this makes it possible to acquire an IR image and a BW image from a substantially same viewpoint, it is possible to appropriately discriminate a flare region.

<Use of Correlation of Luminance>

In the above description, although an edge is used for discrimination between a flare region and a non-flare region, the edge may not be used for the discrimination. For example, a correlation value of respective luminances themselves of an IR image and a BW image may be used. As described before, although an IR image and a BW image have stronger correlation when flare and the like have not occurred, the correlation becomes weaker in a region where flare and the like have occurred. Accordingly, it is possible to appropriately discriminate a flare region by using the correlation between respective luminances themselves of the IR image and the BW image.

Figure 17:
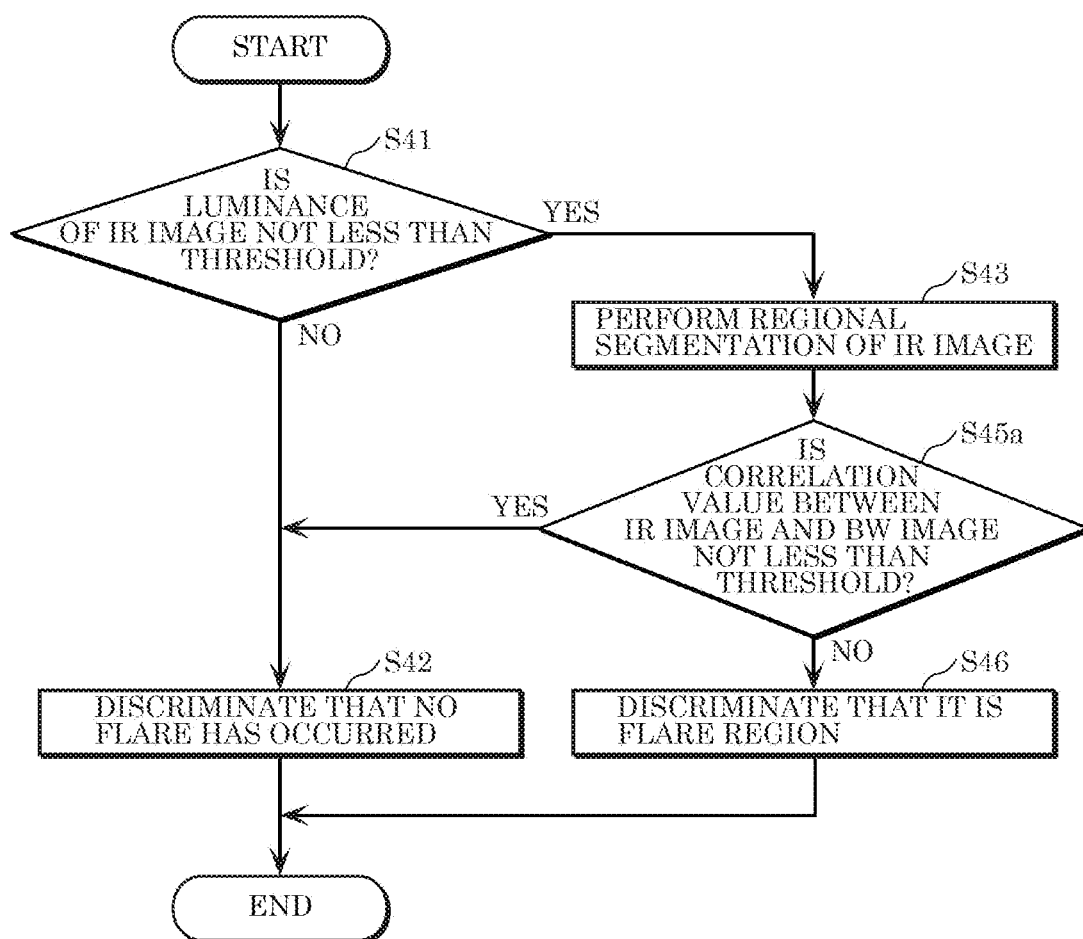
FIG. 17 is a flowchart illustrating an example of alternative processing of steps S31 to S34 of FIG. 15.

FIG. 17 is a flowchart illustrating an example of alternative processing to steps S31 to S34 of FIG. 15. That is, FIG. 17 is a flowchart illustrating detection processing of a flare region by using correlation of respective luminances of an IR image and a BW image. It should be noted that in FIG. 17, the same steps as those of FIG. 16 are given the same reference marks, and detailed description thereof will be omitted. The flow chart shown in FIG. 17, which is different from the flowchart shown in FIG. 16, does not include step S44 and includes step S45a in place of step S45.

(Step S45a)

In step S45a, for each higher luminance region obtained by regional segmentation of step S43, flare detector 112 calculates a correlation value between the luminance of each pixel in the higher luminance region and the luminance of each pixel in the region of the BW image corresponding to the higher luminance region. The correlation value is obtained by arranging the luminance of each pixel of each of the IR image and the BW image in a vector shape for each region, and normalizing the inner product value thereof with the number of pixels. That is, flare detector 112 normalizes an inner product value between a vector consisting of luminance of each pixel in a higher luminance region of the IR image, and a vector consisting of luminance of each pixel in a corresponding region of the BW image. As a result of this, the correlation value for the higher luminance region is calculated.

Here, when the correlation value is not less than a second threshold, that is, is not less than the second threshold (Yes in step S45a), flare detector 112 discriminates that flare and the like have not occurred in that higher luminance region (step S42). On the other hand, when the correlation value is less than the second threshold (No in step S45a), due to the effects of flare and the like, the correlation between the luminance of each pixel in the higher luminance region of the IR image, and the luminance of each pixel in the corresponding region of the BW image has become lower. Therefore, in such a case, flare detector 112 discriminates the higher luminance region as a flare region (step S46).

That is, an image feature amount in each region of the IR image and the BW image, which is used for the detection of a flare region, is an edge included in an image in the region in an example shown in FIG. 16, and is luminance in the region in the example shown in FIG. 17. Here, as described above, the correlation between the luminance in a flare region of the IR image and the luminance in the region of the BW image corresponding to the flare region tends to become lower. Therefore, in the IR image, it is possible to further appropriately detect a flare region by detecting a region with high luminance and low correlation of the luminance as a flare region.

<Use of Census Transform>

Of course, an evaluation value for discriminating a flare region from a non-flare region does not need to be a correlation value. For example, Hamming distance and Census transform may be used. The Census transform is disclosed in, for example, Non-Patent Literature (R. Zabih and J. Woodfill, "Non-parametric Local Transforms for Computing Visual Correspondence", Proc. of ECCV, pp. 151-158, 1994). The Census transform sets a window in an image, and transforms a magnitude relationship between the center pixel and peripheral pixels of the window into a binary vector.

Figure 18:
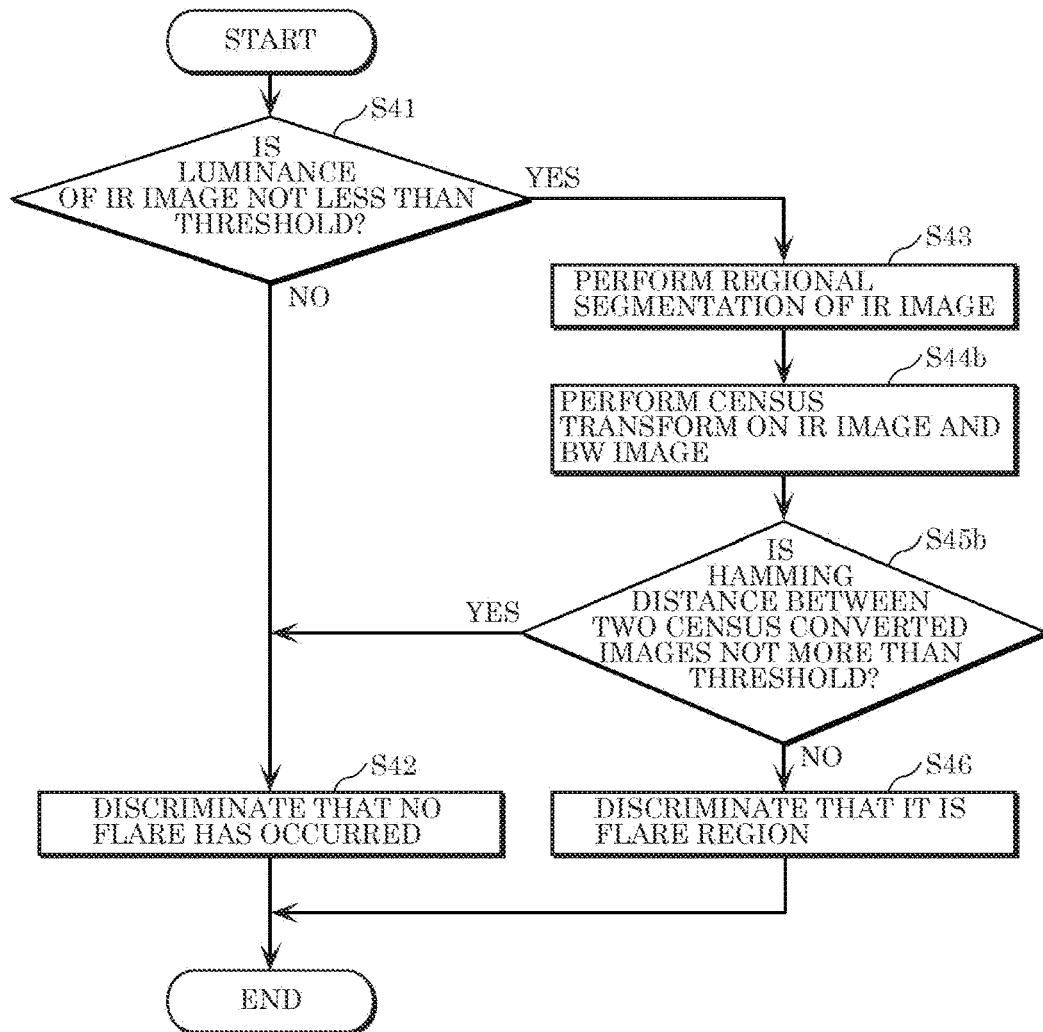
FIG. 18 is a flowchart illustrating another example of alternative processing of steps S31 to S34 of FIG. 15.

FIG. 18 is a flowchart illustrating another example of alternative processing to steps S31 to S34 of FIG. 15. That is, FIG. 18 is a flowchart illustrating detection processing of a flare region by using Census transform of each of the IR image and the BW image. It should be noted that in FIG. 18, the same steps as those of FIG. 16 are given the same reference marks, and detailed description thereof will be omitted. The flowchart shown in FIG. 18, which is different from that shown in FIG. 16, includes steps S44b and S45b in place of steps S44 and S45.

(Step S44a)

In step S44b, flare detector 112 performs Census transform on each of the image of higher luminance region in the IR image, and the image of the corresponding region in the BW image, for each higher luminance region obtained by regional segmentation in step S43. As a result of this, a Census converted image for the image of the higher luminance region in the IR image, and a Census converted image for the image of corresponding region in the BW image are generated.

(Step S45b)

Next, in step S45b, flare detector 112 calculates a Hamming distance between the Census converted image of the IR image and the Census converted image of the BW image, which are obtained in step S44b. Then, when a value of the Hamming distance normalized with the number of pixels is not more than a third threshold (Yes in step S45b), flare detector 112 discriminates that flare and the like have not occurred in the higher luminance region (step S42). On the other hand, when the value of normalized Hamming distance is more than the third threshold (No in step S45b), flare detector 112 judges that the texture is lost in the image of the higher luminance region due to the effect of flare and the like. Consequently, flare detector 112 discriminates the higher luminance region as a flare region (step S46).

That is, for each of one or more higher luminance regions having a luminance not less than the first threshold value in the IR image, flare detector 112 acquires a first converted image by performing Census transform on the image in the concerned higher luminance region. Then, flare detector 112 acquires a second converted image by performing Census transform on the image in the region of the BW image corresponding to the concerned higher luminance region. It should be noted that the first converted image and the second converted image are the above-described Census converted images. Next, flare detector 112 detects, as the flare region, a higher luminance region having a Hamming distance more than a third threshold from at least one higher luminance region, the Hamming distance being a distance between the first converted image and the second converted image. In this way, it is also possible to appropriately detect a flare region by using the Census transform.

<Use of Luminance of IR Image>

In the example shown in FIG. 17, although the luminance of an IR image, and a correlation value between luminances of the IR image and the BW image were used for discrimination between the flare region and the non-flare region, only the luminance of the IR image may be used.

Figure 19:
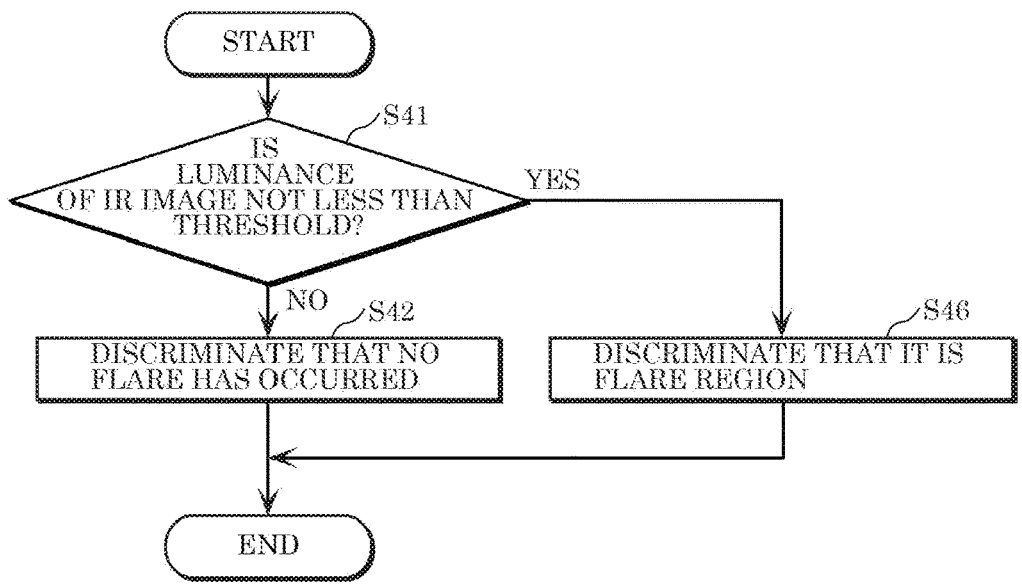
FIG. 19 is a flowchart illustrating another example of alternative processing of steps S31 to S34 of FIG. 15.

FIG. 19 is a flowchart illustrating another example of alternative processing to that of steps S31 to S34 of FIG. 15. That is, FIG. 19 is a flowchart illustrating detection processing of a flare region by using only the luminance of an IR image. It should be noted that in FIG. 19, the same steps as those of FIG. 16 are given the same reference marks, and description thereof will be omitted. In the flowchart shown in FIG. 19, steps S43 to S45 shown in FIG. 16 are omitted.

That is, in step S41, flare detector 112 determines whether or not the luminance of a pixel of an IR image is not less than a first threshold. Here, upon determining that the luminance of the pixel is less than the first threshold (No in step S41), flare detector 112 discriminates that no flare has occurred in the region including the pixel (step S42). On the other hand, upon determining that the luminance of the pixel is not less than the first threshold (Yes in step S41), flare detector 112 discriminates that a flare has occurred in the region including the pixel. That is, flare detector 112 discriminates that region as a flare region (step S46).

That is, in the example shown in FIG. 19, flare detector 112 detects, as the flare region, a region having a luminance not less than the first threshold in the IR image. Since the luminance in the flare region tends to be higher than the luminance outside the flare region, it is possible to appropriately detect a flare region by detecting, as the flare region, a region having a luminance not less than the first threshold Moreover, discrimination between a flare region and a non-flare region may be realized by using learning process. For the learning process, for example, processing such as Deep Learning may be used. In this case, for performing learning, an IR image and a BW image, and a correct image, in which the IR image is segmented into a flare region and a non-flare region, are prepared in advance. Next, the IR image and the BW image are given to the learning model as input. Then, the learning model is trained such that output from the learning model with respect to the input matches the correct image. The learning model is, for example, a neural network. The output from the learning model is an image whose each pixel indicates numeral "0" or numeral "1", where numeral "0" indicates that that pixel belongs to a non-flare region, and numeral "1" indicates that that pixel belongs to a flare region.

By using a learning model which has been thus trained in advance, flare detector 112 performs discrimination between a flare region and a non-flare region. That is, flare detector 112 inputs an IR image and a BW image to the learning model, as input. Then, flare detector 112 discriminates a region including a pixel corresponding to numeral "0" outputted from the learning model, as the non-flare region. Further, flare detector 112 discriminates a region including a pixel corresponding to numeral "1" outputted from the learning model, as the flare region.

By the processing described so far, flare detector 112 segments the imaged IR image into a flare region in which flare and the like have occurred, and a non-flare region.

<Depth Correction Processing>

Second depth estimator 111b generates second depth information by using a BW image, first depth information, and a flare region (that is, the discrimination result of the above-described region).

Flare and the like are a phenomenon which is dependent on the wavelength of light. For that reason, flare and the like that have occurred in an IR image do not often occur in a BW image. Accordingly, it is possible to acquire second depth information, which is free from effects of flare and the like which have occurred in the IR image, by correcting the first depth information, only for the flare region, by using not only the first depth information obtained from the IR image, but also the BW image For the acquisition of the second depth information, a guided filter which is a type of image correction filter may be used. The guided filter is disclosed in Non Patent Literature Maiming He, Jian Sun and Xiaoou Tang, "Guided Image Filtering", IEEE Transactions on Pattern Analysis and Machine Intelligence, Vol. 35, Iss. 6, pp. 1397-1409, 2013). The guided filter is a filter that corrects a target image by using correlation between the target image and a reference image. In the guided filter, it is supposed that a reference image I and a target image p are represented by parameters a and b as indicated by the following (Equation 2).

$$q_i = a_k I_i + b_k, \forall i \in \omega_k \quad \text{(Equation 2)}$$

Where, q indicates an output image obtained by correcting target image p, i indicates the number of each pixel, and ωk indicates a peripheral region of pixel k. Moreover, parameters a and b are represented by the following (Equation 3).

$$a_k = \frac{\frac{1}{|\omega|}\sum_{i \in \omega_k} I_i p_i - \mu_k \overline{p}_k}{\sigma_k^2 + \epsilon} \quad \text{(Equation 3)}$$

$$b_k = \overline{p}_k - a_k \mu_k$$

Where, ε is a regularization parameter. Further, μ and σ are the mean and variance in a block of reference image, and are calculated by the following (Equation 4).

$$\mu_k = \frac{1}{|\omega|}\sum_{i \in \omega_k} I_i \quad \text{(Equation 4)}$$

$$\sigma_k^2 = \frac{1}{|\omega|}\sum_{i \in \omega_k} (I_i - \mu_k)^2$$

Where, to suppress noises included in the obtained parameters a and b, the output is obtained as shown in the following (Equation 5) by using averaged parameters.

$$q_i = \overline{a}_k I_i + \overline{b}_k \quad \text{(Equation 5)}$$

$$\overline{a}_k = \frac{1}{|\omega|}\sum_{k \in \omega_i} a_k$$

$$\overline{b}_k = \frac{1}{|\omega|}\sum_{k \in \omega_i} b_k$$

In the present embodiment, second depth estimator 111b corrects the first depth information (or the first depth image) which is the target image by giving a BW image as the reference image. As a result of this, the second depth information is generated or acquired. In order to generate such second depth information, an IR image and a BW image having substantially the same viewpoint position are required. In depth acquisition device 1 of the present embodiment, for each pixel, the filter used for the pixel is set to either the IR filter or the BW filter. That is, as shown in FIG. 2, first pixel 21 having an IR filter and second pixel 22 having a BW filter are alternately arranged in the column direction. As a result of this, an IR image and a BW image, which have a substantially same viewpoint can be acquired, and therefore appropriate second depth information can be acquired.

Of course, second depth estimator 111b may use a process other than the guided filter. For example, second depth estimator 111b may use a process such as bilateral filter (Non Patent Literature: C. Tomasi, R. Manduchi, "Bilateral filtering for gray and color images", IEEE International Conference on Computer Vision (ICCV), pp. 839-846, 1998), or Mutual-Structure for Joint Filtering (Non Patent Literature: Xiaoyong Shen, Chao Zhou, Li Xu and Jiaya Jia, "Mutual-Structure for Joint Filtering", IEEE International Conference on Computer Vision (ICCV), 2015) may be used.

As described above, in the present embodiment, the first depth information is used for a region which is discriminated that flare and the like have not occurred (that is, a non-flare region), and the second depth information is used for the region where flare and the like have occurred (that is, a flare region). As a result of this, even if flare and the like have occurred in the IR image, more accurate depth information can be acquired.

Variation 1

In the above embodiment, a filter such as a guided filter is used to generate the second depth information, but the second depth information may be generated by using a learning model.

For example, like Non Patent Literature (Shuran Song, Fisher Yu, Andy Zeng, Angel X. Chang, Manolis Savva and Thomas Funkhouser, "Semantic Scene Completion from a Single Depth Image", IEEE Conference on Computer Vision and Pattern Recognition (CVPR), pp. 190-198, 2017), Deep Learning which is learning process may be used. That is, the learning model may be trained such that when the BW image and the first depth information are inputted, the second depth information is outputted. The above Non Patent Literature proposes a network which, when inputted with depth information including a missing region and a color image, interpolates the missing region of the depth information. Second depth estimator 111b in this variation gives an IR image, a BW image, and first depth information to a network (that is, a learning model) similar to that of the Non Patent Literature, and further gives a flare region detected by flare detector 112 as a mask image of the missing region. This makes it possible to acquire more accurate second depth information from the network.

Figure 20:
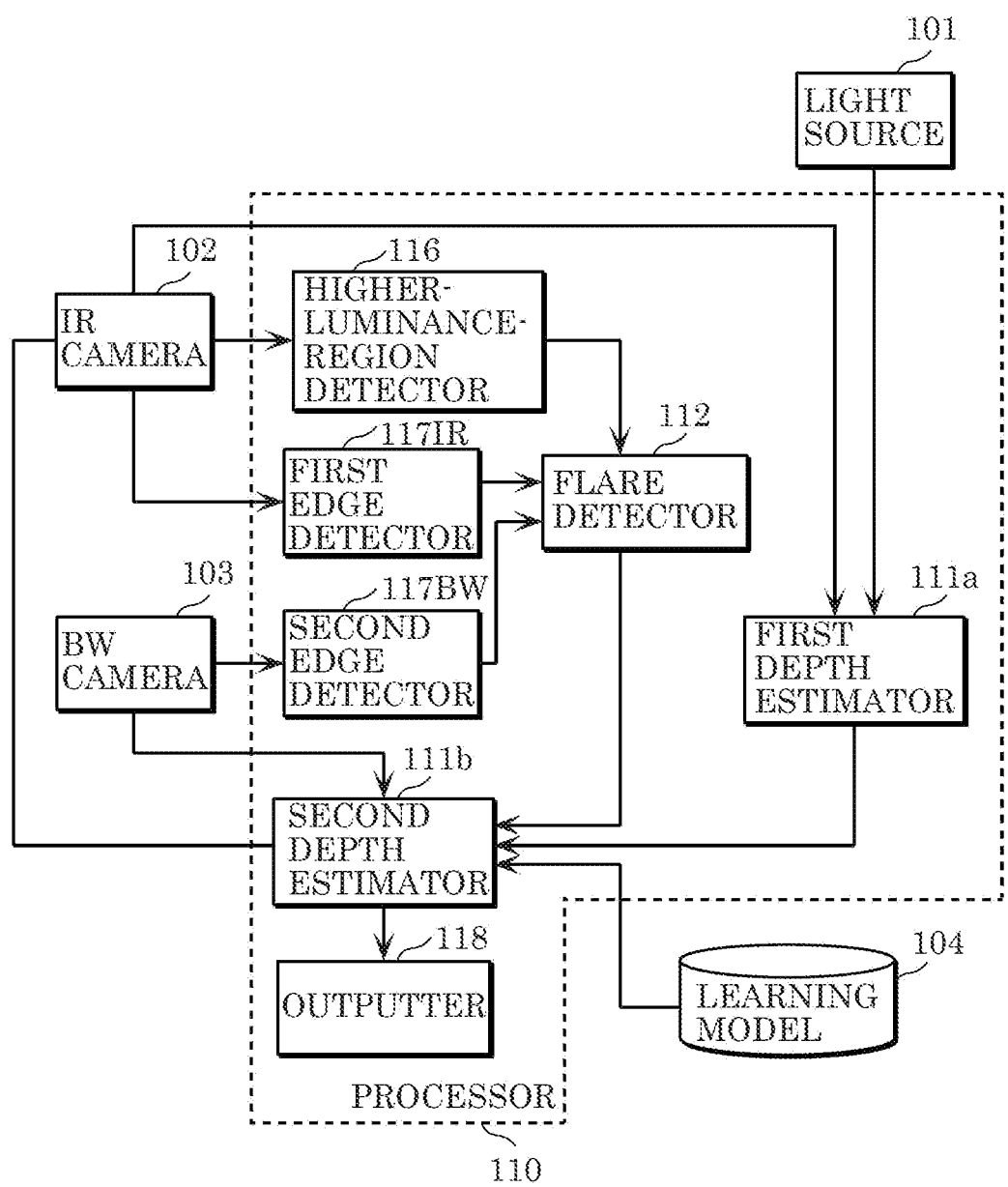
FIG. 20 is a block diagram illustrating an example of a functional structure of the depth acquisition device according to Variation 1 of Embodiment.

FIG. 20 is a block diagram illustrating an example of the functional structure of depth acquisition device 1 according to this variation.

Depth acquisition device 1 in this variation includes each component shown in FIG. 8, and further includes learning model 104 including, for example, a neural network.

Second depth estimator 111b inputs three types of data: an IR image, a BW image, and first depth information, into learning model 104, and generates second depth information by using a flare region as a mask region to be corrected.

In the training of learning model 104, in addition to the IR image, the BW image, and the first depth information, a correct depth image is prepared in advance. Next, the IR image, the BW image, the first depth information, and the mask image that specifies a flare region are given to learning model 104 as input. Then, learning model 104 is trained so that the output from learning model 104 with respect to the input matches the correct depth image. It should be noted that at the time of training, mask images are randomly given. Second depth estimator 111b uses learning model 104 that has been trained in advance in this way. That is, second depth estimator 111b can acquire second depth information outputted from learning model 104 by inputting the IR image, the BW image, the first depth information, and the mask image that specifies the flare region to learning model 104.

In this way, in this variation, second depth estimator 111b estimates the depth information indicating the depth at each position in the IR image, and corrects the depth at each position in the flare area as indicated by its depth information by inputting the IR image, the BW image, the flare region, and the depth information thereof to the learning model. Therefore, if the learning model is trained in advance such that a correct depth at each position in the flare region is outputted for the inputs of the IR image, the BW image, the flare region, and the depth information, it is possible to appropriately correct the depth information estimated from the IR image. That is, it is possible to appropriately correct the depth at each position in the flare region indicated by the depth information.

As described above, second depth estimator 111b may use Deep Learning. In that case, it is not necessary to directly output the flare region, and the second depth information may be directly generated by Deep Learning.

Figure 21:
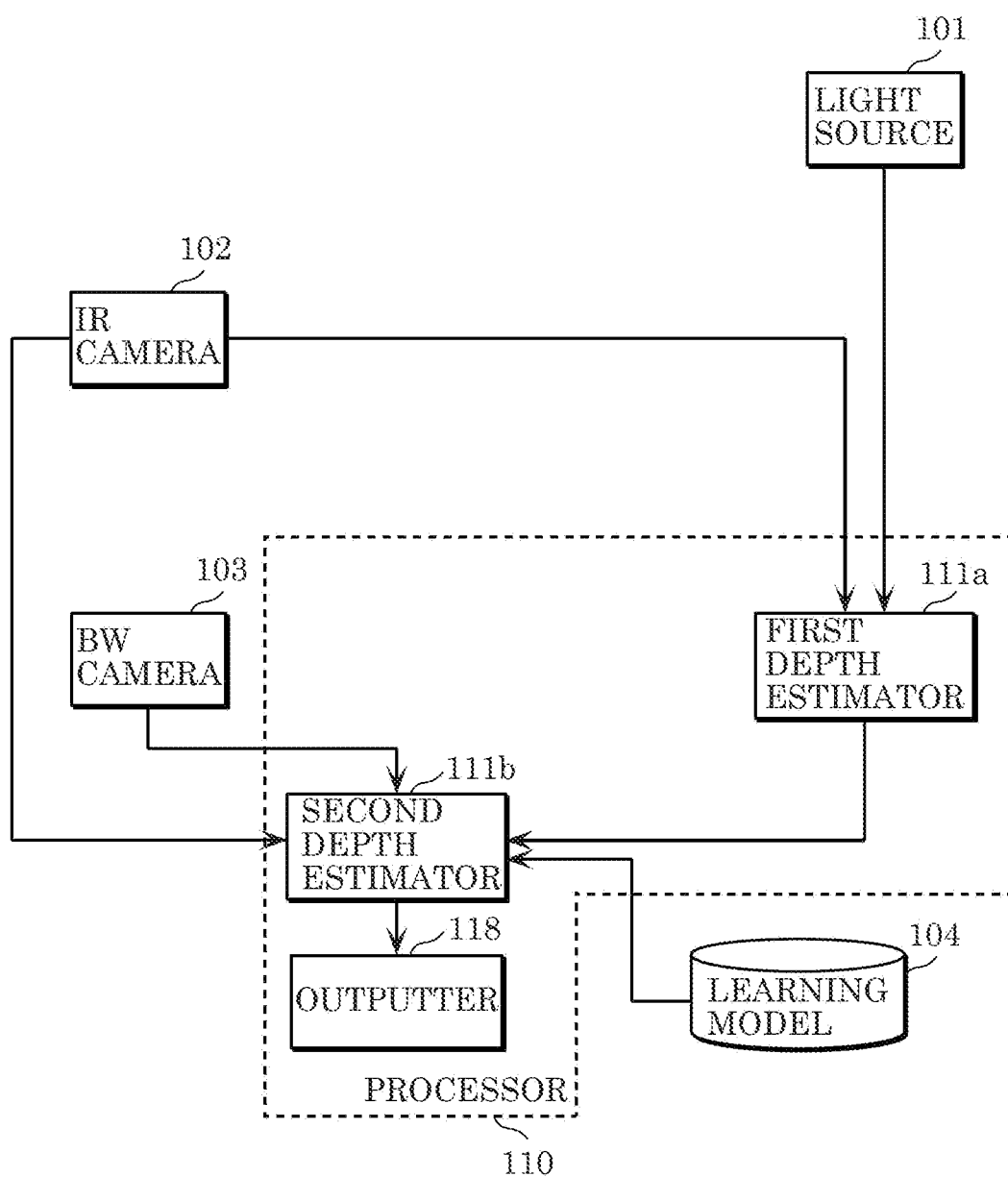
FIG. 21 is a block diagram illustrating another example of a functional structure of the depth acquisition device according to Variation 1 of Embodiment.

FIG. 21 is a block diagram illustrating another example of a functional structure of depth acquisition device 1 according to this variation.

Depth acquisition device 1 in this variation does not include flare detector 112, higher-luminance-region detector 116, first edge detector 117IR, and second edge detector 117BW, and include components other than these among the components shown in FIG. 20.

In the training of learning model 104, a correct depth image is prepared in advance in addition to the IR image, the BW image, and the first depth information, as in the example shown in FIG. 20. Next, the IR image, the BW image, and the first depth information are given to learning model 104 as input. Then, learning model 104 is trained such that the output from learning model 104 with respect to the input matches the correct depth image. As learning model 104, a VGG-16 network to which Skip connection is added may be used as in Non Patent Literature (Caner Hazirbas, Laura Leal-Taixe and Daniel Cremers. Hazirbas, "Deep Depth From Focus", In ArXiv preprint arXiv, 1704.01085, 2017). The number of channels of learning model 104 is changed such that the IR image, the BW image, and the first depth information are given as inputs to that learning model 104. By using learning model 104 that has been trained in advance in this way, second depth estimator 111b can easily obtain second depth information from that learning model 104 by inputting the IR image, the BW image, and the first depth information to learning model 104.

That is, depth acquisition device 1 shown in FIG. 21 includes a memory and processor 110. It should be noted that the memory, though not shown in FIG. 21, may be provided in depth acquisition device 1 as shown in FIG. 5. Processor 110 acquires timing information indicating the timing at which light source 101 irradiates the subject with infrared light. Next, processor 110 acquires an IR image, which is obtained by imaging a scene including a subject with infrared light according to the timing indicated by the timing information, and is retained in a memory. Next, processor 110 acquires a BW image which is retained in a memory and obtained by imaging of a substantially same scene as that of the IR image, the imaging being performed with visible light at a substantially same viewpoint and imaging time as those of the IR image. Then, first depth estimator 111a of processor 110 estimates the depth information indicating the depth at each position in the IR image. By inputting the IR image, the BW image, and the depth information to learning model 104, second depth estimator 111b corrects the depth at each position in the flare region of the IR image indicated by the depth information.

Therefore, if learning model 104 is trained in advance such that a correct depth at each position in the flare region of the IR image is outputted for the inputs of the IR image, the BW image, and the depth information, it is possible to appropriately correct the depth information estimated from the IR image. That is, it is possible to appropriately correct the depth at each position in the flare region indicated by the depth information without detecting the flare region.

Variation 2

<Use of Time Direction>

Here, flare detector 112 may use the information in the time direction for discriminating between the flare region and the non-flare region. Flare is not a subject itself, but a phenomenon that occurs inside IR camera 102 due to the relationship between the subject and light source 101. Therefore, when IR camera 102 is moved, the shape of the flare region will change. Accordingly, flare detector 112 detects a flare region candidate from the IR image by the above-described method, and determines whether or not the shape of the candidate has changed from the flare region detected in the previous IR image. Then, upon determining that the shape has not changed, flare detector 112 may judge that the candidate is not a flare region but a non-flare region.

Figure 22:
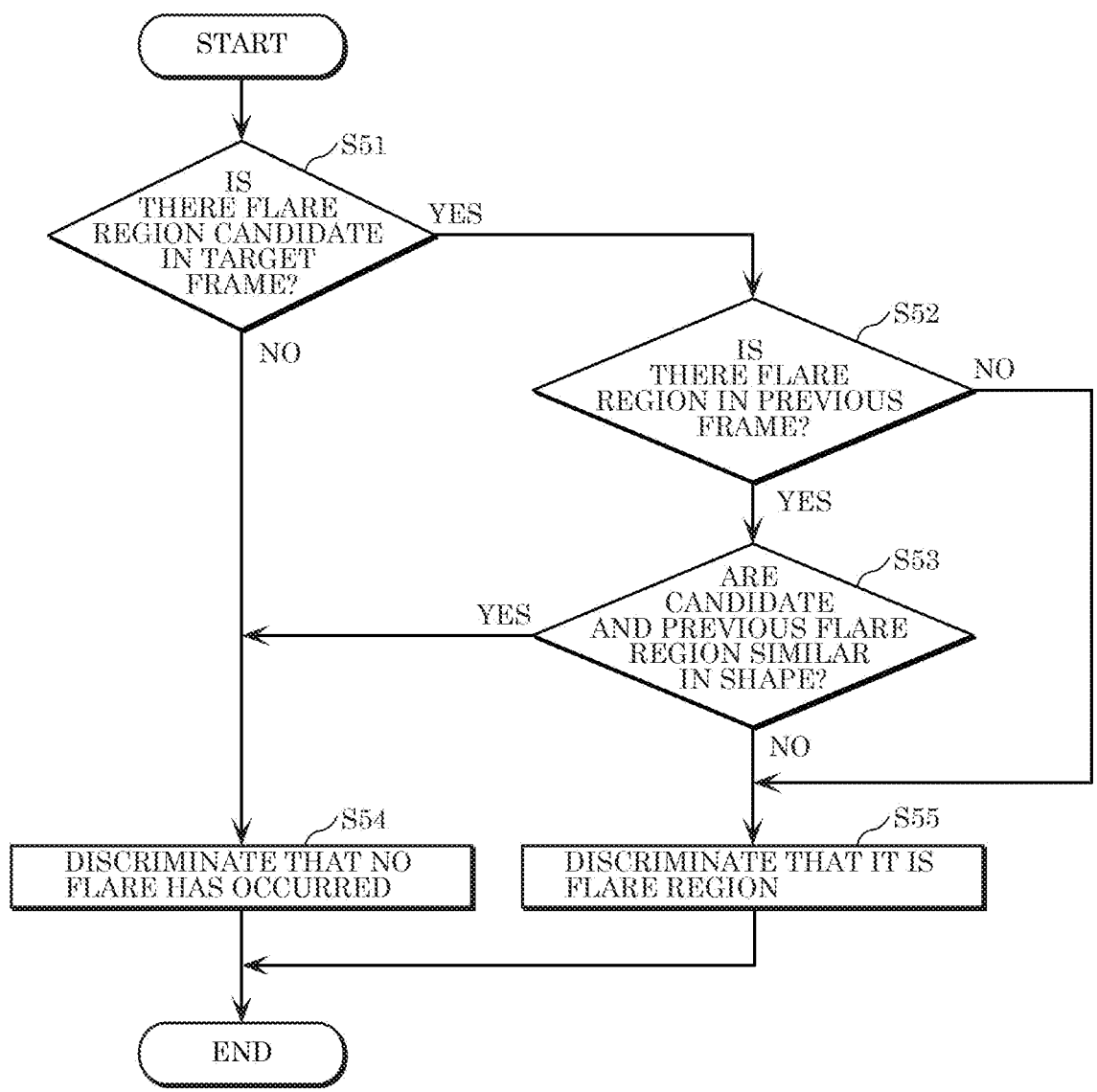
FIG. 22 is a flowchart illustrating processing operation of a flare detector according to Variation 2 of Embodiment.

FIG. 22 is a flowchart illustrating processing operation of flare detector 112 according to this variation.

(Step S51)

First, flare detector 112 determines whether or not a flare region candidate exists in a target frame. That is, flare detector 112 determines whether or not the flare region detected based on, for example, the flowcharts shown in FIGS. 16 to 19 described above exists in the target frame as a candidate for the flare region, not as the final flare region. It should be noted that the target frame is an IR image to be discriminated, that is, an IR image in which the existence of a flare region is discriminated.

(Step S54)

Here, when a flare region candidate does not exist in the target frame (No in step S51), flare detector 112 discriminates that no flare exists in the target frame (that is, the IR image).

(Step S52)

On the other hand, when a flare region candidate exists in the target frame (Yes in step S51), flare detector 112 determines whether or not a flare region also exists in a frame before the target frame. It should be noted that the frame before the target frame is an IR image acquired by imaging with IR camera 102 before the target frame.

(Step S55)

Here, when no flare region exists in the frame before the target frame (No in step S52), flare detector 112 discriminates that the detected flare region candidate is a region that has occurred due to flare, that is, a flare region.

(Step S53)

On the other hand, when a flare region exists in the frame before the target frame (Yes in step S52), flare detector 112 compares the shape of the flare region candidate of the target frame with the shape of the flare region of the previous frame. Here, when the shape of the flare region candidate of the target frame and the shape of the flare region of the previous frame are similar (Yes in step S53), flare detector 112 executes the processing of step S54. That is, flare detector 112 updates the detected flare region candidate to a non-flare region, and discriminates that no flare exists in the target frame (that is, the IR image). On the other hand, when the shape of the flare region candidate of the target frame and the shape of the flare region of the previous frame are not similar (No in step S53), flare detector 112 executes the processing of step S55. That is, flare detector 112 discriminates that the detected flare region candidate is a region that has occurred due to flare, that is, a flare region.

In this way, flare detector 112 in this variation uses the information in the time direction. That is, flare detector 112 uses the shape of the flare region or its candidate in each of the frames acquired at mutually different times. Thereby, it is possible to discriminate between the flare region and the non-flare region with higher accuracy.

It should be noted that flare detector 112 may discriminate the flare region for each of a plurality of nearby frames without discriminating the flare region for each frame. It should be noted that the plurality of nearby frames are, for example, a plurality of IR images continuously acquired in time by, imaging with IR camera 102. That is, flare detector 112 may detect candidates of flare region in each of the plurality of nearby frames, for example, based on the flowcharts shown in FIGS. 16 to 19 described above, and discriminates whether or not those candidates are flare regions. More specifically, flare detector 112 compares the shapes of the candidates of flare region in each frame, and if the shapes of the candidates of flare region are substantially equal, discriminates that those candidates are not flare regions, that is, are non-flare regions. On the other hand, if the shapes of the candidates of flare region are not similar, flare detector 112 discriminates that those candidates are flare regions.

Further, flare detector 112 may determine whether or not those shapes are similar by determining whether or not the similarity between two shapes is not less than a threshold. The similarity may be calculated as, for example, a correlation value between two shapes.

(Variation 3) <Use of Multiple IR Original Images>

Depth acquisition device 1 in the above-described embodiment and variations 1 and 2 detects a flare region by using the IR image and the BW image, but the BW image may not be used. Depth acquisition device 1 in this variation detects a flare region using a plurality of IR original images. The plurality of IR original images are, for example, an infrared image obtained in the first exposure period and an infrared image obtained in the second exposure period shown in FIG. 3.

That is, in this variation, when IR camera 102 acquires a plurality of infrared images at mutually different timings in order to estimate the first depth information using TOF or the like, the flare region and the non-flare region are discriminated by using these infrared images. In the following description, each of the plurality of infrared images is referred to as an IR original image. It can be said that the above-described IR image is constituted by the plurality of these IR original images.

There are two types of depth estimation by TOF: direct TOF, which directly measures the arrival time of emitted light, and indirect TOF, which estimates depth from a plurality of IR original images obtained by different timings of light emission and light reception. In this variation, depth acquisition device 1 discriminates between a flare region and a non-flare region from a plurality of IR original images acquired during indirect TOF.

The timing at which each of the plurality of IR original images is obtained, that is, the timing at which each of the plurality of IR original images receives light is different. Therefore, even if a flare has occurred in a first IR original image among the plurality of IR original images, it is highly likely that no flare has occurred in a second IR original image whose light receiving timing is different from that of the first IR original image. Therefore, depth acquisition device 1 in this variation discriminates between a flare region and a non-flare region by comparing a plurality of IR original images acquired by changing the timing of light reception. This makes it possible to bring the third depth image closer to the correct depth image shown in (d) of FIG. 14.

[Specific Processing Flow of Depth Acquisition Device]

Figure 23:
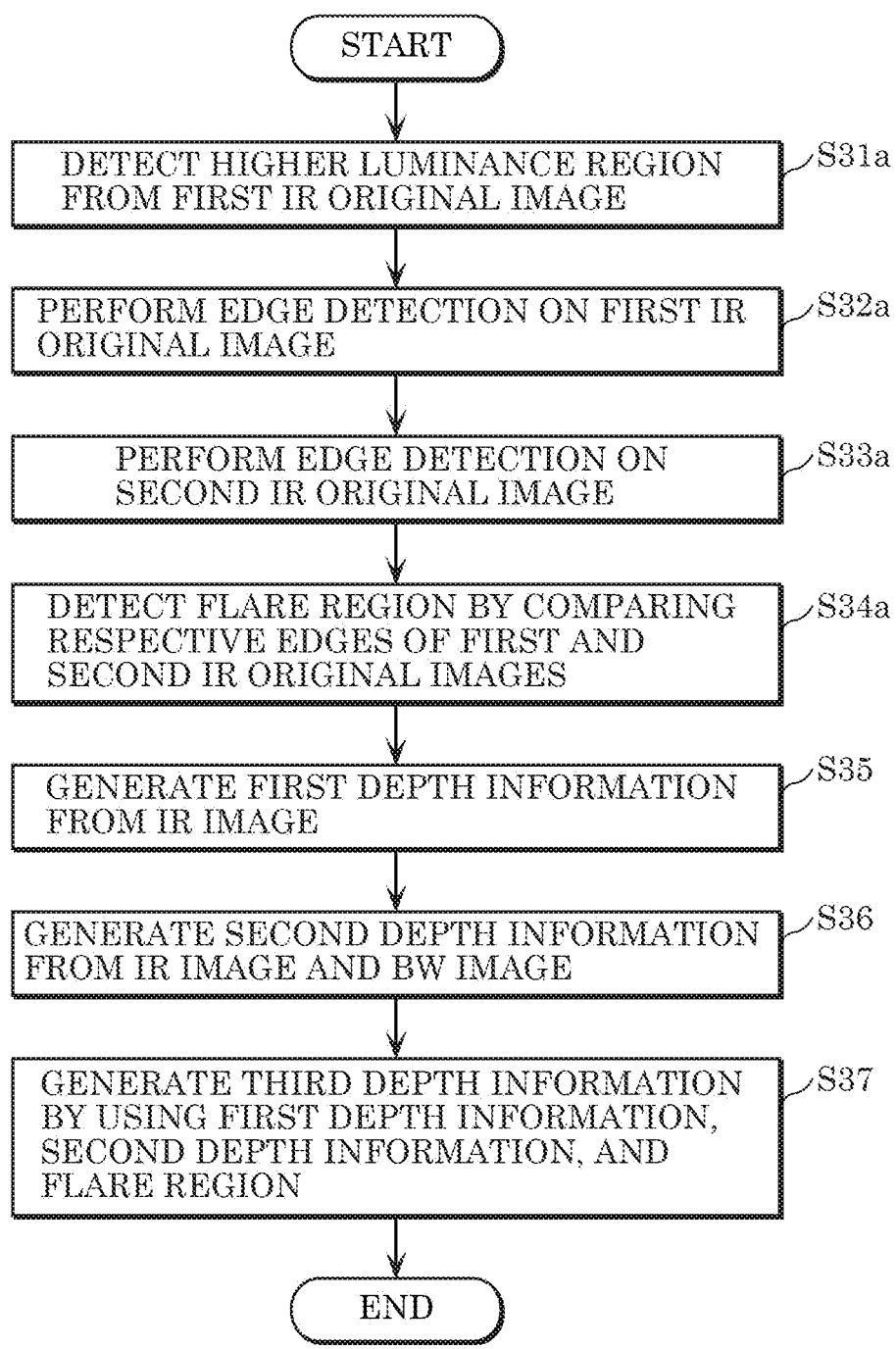
FIG. 23 is a flowchart illustrating overall processing operation of the depth acquisition device according to Variation 3 of Embodiment.

FIG. 23 is a flowchart illustrating overall processing operation of depth acquisition device 1 according to this variation.

(Step S31a)

First, higher-luminance-region detector 116 detects a higher luminance region from a first IR original image.

(Step S32a) First edge detector 117IR detects an edge in the first IR original image.

(Step S33a)

Second edge detector 117BW detects an edge in the second IR original image instead of the BW image.

(Step S34a)

Flare detector 112 detects a flare region in an IR image by comparing the edge in a higher luminance region with the edge in the corresponding region of the second IR original image for each of one or more higher luminance regions of the first IR original image. That is, when the correlation value between the edge in the higher luminance region and the edge in the corresponding region of the second IR original image is less than a fourth threshold value, flare detector 112 detects the higher luminance region as a flare region. As a result of this, the IR image is regionally segmented into at least one flare region, and a non-flare region.

(Step S35)

First depth estimator 111a generates first depth information from an IR image by using, for example, TOF.

(Step S36)

Second depth estimator 111b generates second depth information indicating the depth of a flare region based on the first depth information of the IR image, and the BW image.

(Step S37)

Outputter 118 generates third depth information by replacing the depth of flare region indicated by the first depth information with the depth indicated by the second depth information.

Figure 24:
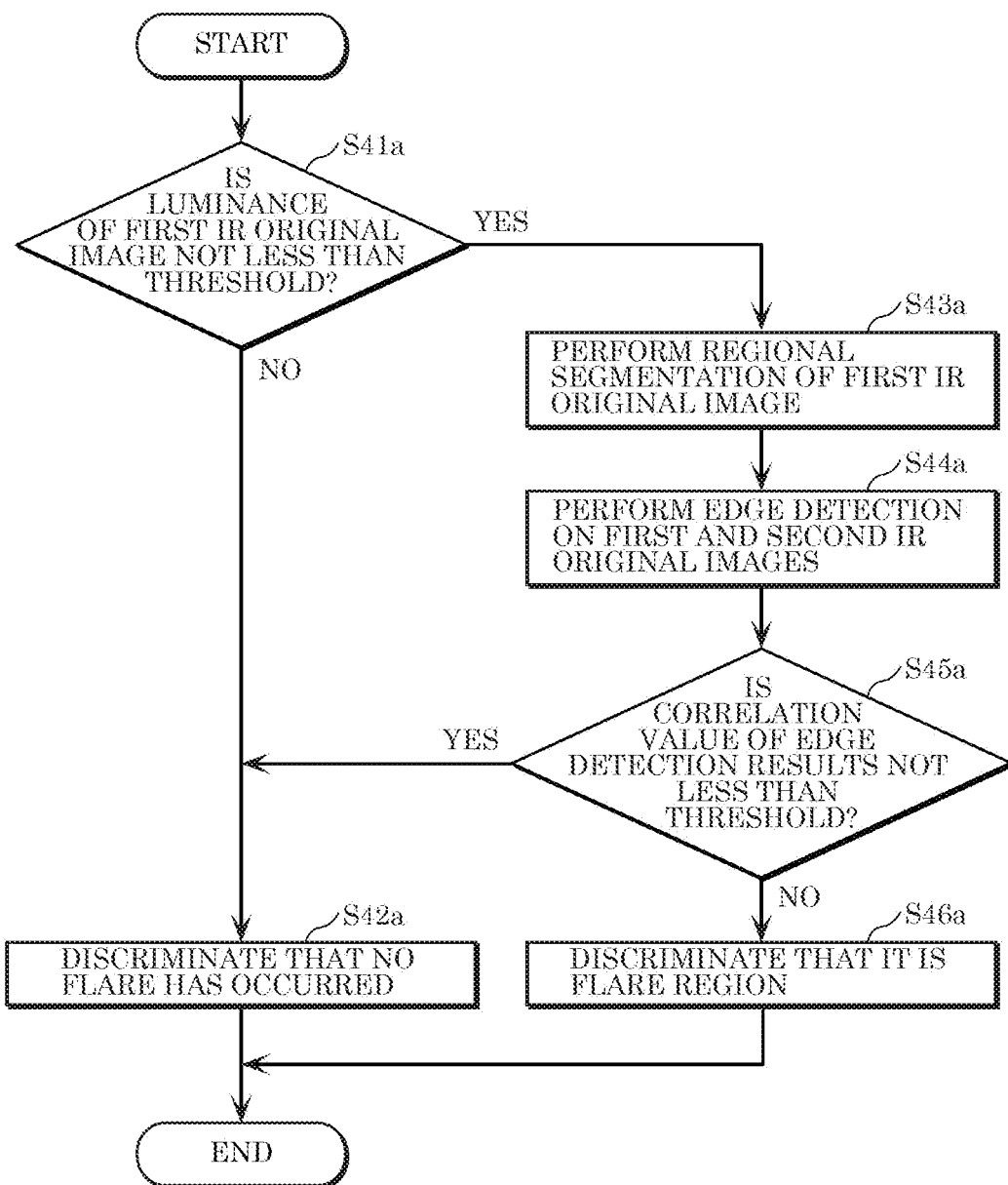
FIG. 24 is a flowchart illustrating detailed processing of steps S31a to S34a of FIG. 23.

FIG. 24 is a flowchart illustrating detailed processing of steps S31a to S34a of FIG. 23.

(Step S41a)

First, higher-luminance-region detector 116 determines whether or not the luminance at each position in a first IR original image is not less than a fifth threshold. Here, the fifth threshold may be, for example, about 1500 if the first IR original image is an image of 12-bit gradation. Of course, this fifth threshold may be a value that varies according to environmental conditions or settings of IR camera 102. For example, when a dark scene such as night is imaged, since the luminance of the entire first IR original image will be lower, the fifth threshold may be a smaller value than that when a bright scene in daytime is imaged. Moreover, when the exposure time of IR camera 102 is long, since the luminance of the entire first IR original image will be higher, the fifth threshold may be a larger value than that when the exposure time is short.

(Step S42a)

Here, upon determining that the luminance at any position is not equal to or greater than the fifth threshold (No in step S41a), higher-luminance-region detector 116 determines that no flare has occurred in the IR image constituted by using the first IR original image (step S42a). That is, the entire IR image is determined as a non-flare region.

(Step S43a)

On the other hand, upon determining that the luminance at any position is not less than the fifth threshold (Yes in step S41a), higher-luminance-region detector 116 performs regional segmentation of the first IR original image. That is, higher-luminance-region detector 116 segments the first IR original image into at least one higher luminance region, and a region other than the higher luminance region. For this regional segmentation, for example, a method based on luminance, such as Super Pixel may be used.

(Step S44a)

Next, first edge detector 117IR and second edge detector 117BW respectively perform edge detection on a first IR original image and a second IR original image. For edge detection, Canny method or Sobel filter, etc. may be used.

(Step S45a)

For each of one or more higher luminance regions of the first IR original image, flare detector 112 compares an edge in the higher luminance region and an edge in the region of the second IR original image corresponding to the higher luminance region. That is, flare detector 112 determines whether or not a correlation value between the edge in the higher luminance region of the first IR original image and the edge in the corresponding region of the second IR original image is not less than a fourth threshold. The correlation value is obtained by arranging each value, which is outputted by performing edge detection on each of the first IR original image and the second IR original image, in a vector shape for each region, and normalizing the inner product value thereof. That is, flare detector 112 normalizes an inner product value between a vector consisting of multiple values obtained by edge detection in a higher luminance region of the first IR original image, and a vector consisting of multiple values obtained by edge detection in a region of the second IR original image corresponding to that higher luminance region. As a result of this, the correlation value for a higher luminance region is calculated.

(Step S46a)

Here, upon determining that the correlation value is not equal to or greater than the fourth threshold, that is, less than the fourth threshold (No in step S45a), flare detector 112 determines the higher luminance region as a flare region. That is, since there is no correlation of edge between a region in which flare has occurred in the first IR original image and a corresponding region of the second IR original image, flare detector 112 discriminates the higher luminance region in the first IR original image as a flare region. That is, flare detector 112 discriminates the higher luminance region in the IR image as the flare region. It should be noted that the higher luminance region in the IR image is the same region as the higher luminance region in the first IR original image.

On the other hand, upon determining, in step S45a, that the correlation value is not less than the fourth threshold value, that is, is not less than the fourth threshold value (Yes in step S45a), flare detector 112 determines that flare and the like have not occurred in the higher luminance region. That is, flare detector 112 determines the higher luminance region as a non-flare region.

<Use of Correlation of Luminance>

In the above description, although an edge is used for discrimination between a flare region and a non-flare region, the edge may not be used for the discrimination. For example, a correlation value of respective luminances themselves of a first IR original image and a second IR original image may be used. As described before, although a first IR original image and a second IR original image have stronger correlation when flare and the like have not occurred, the correlation becomes weaker in a region where flare and the like have occurred. Accordingly, it is possible to appropriately discriminate a flare region by using the correlation between respective luminances of the first IR original image and the second IR original image.

Figure 25:
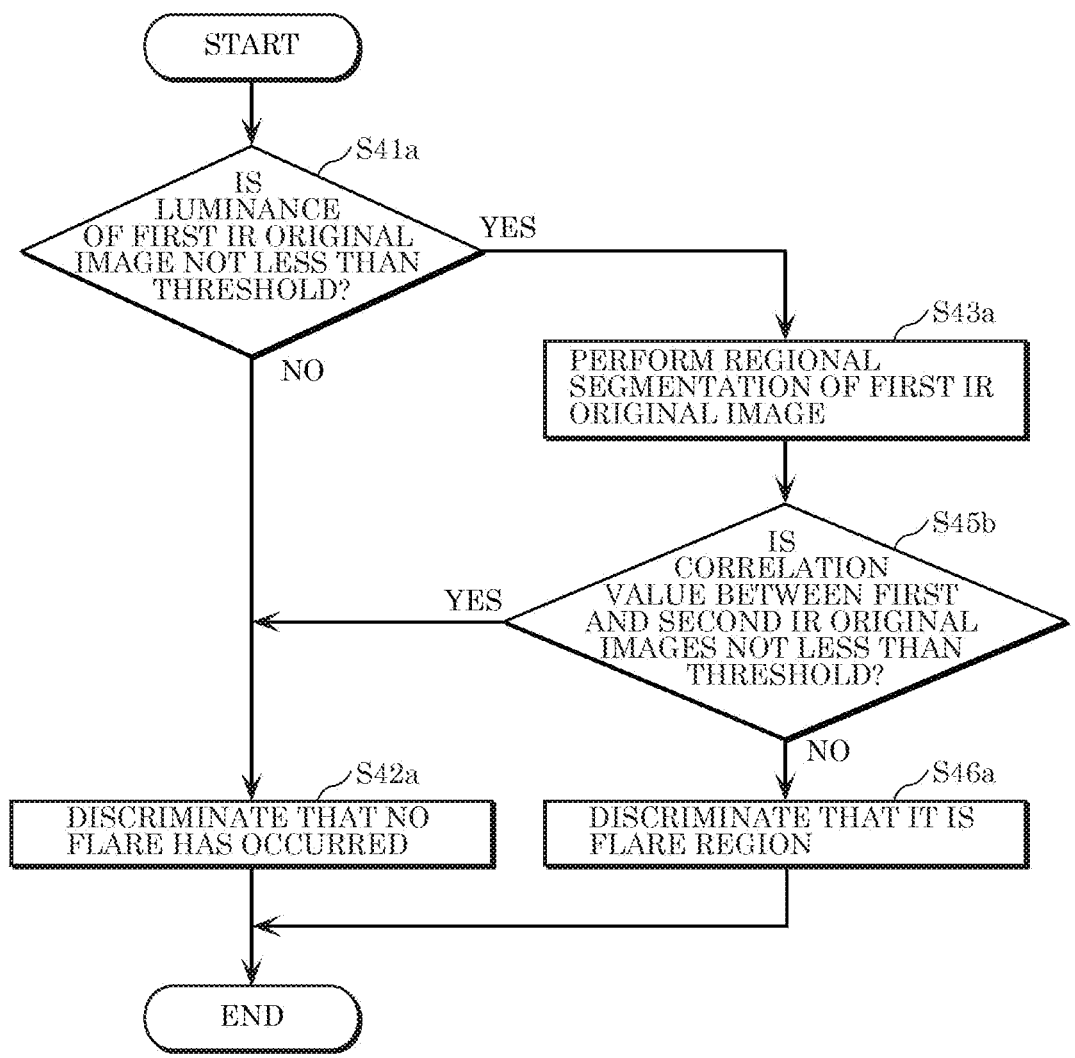
FIG. 25 is a flowchart illustrating an example of alternative processing of steps S31a to S34a of FIG. 23.

FIG. 25 is a flowchart illustrating an example of alternative processing of steps S31a to S34a in FIG. 23. That is, FIG. 25 is a flowchart illustrating detection process of a flare region using the correlation of respective luminances of the first IR original image and the second IR original image. It should be noted that in FIG. 25, the same steps as those in FIG. 24 are given the same reference marks, and detailed description thereof will be omitted. The flowchart shown in FIG. 25, unlike the flowchart shown in FIG. 24, does not include step S44a and includes step S45b instead of step S45a.

(Step S45b)

In step S45b, for each higher luminance region obtained by regional segmentation of step S43a, flare detector 112 calculates a correlation value between the luminance of each pixel in the higher luminance region and the luminance of each pixel in the region of the second IR original image corresponding to the higher luminance region. The correlation value is obtained by arranging the luminance of each pixel of each of the first IR original image and the second IR original image in a vector shape for each region, and normalizing the inner product value thereof with the number of pixels. That is, flare detector 112 normalizes an inner product value between a vector consisting of luminance of each pixel in a higher luminance region of the first IR original image, and a vector consisting of luminance of each pixel in a corresponding region of the second IR original image. This makes it possible to calculate the correlation value for the higher luminance region.

Here, when the correlation value is not less than a fourth threshold, that is, is not less than the fourth threshold (Yes in step S45b), flare detector 112 discriminates that flare and the like have not occurred in that higher luminance region (step S42a). On the other hand, when the correlation value is less than the fourth threshold (No in step S45b), due to the effect of flare and the like, the correlation between the luminance of each pixel in the higher luminance region of the first IR original image, and the luminance of each pixel in the corresponding region of the second IR original image has become lower. Therefore, in such a case, flare detector 112 discriminates the higher luminance region as a flare region (step S46a).

That is, an image feature amount in respective regions of the first IR original image and the second IR original image, which is used for the detection of a flare region, is an edge included in an image in the region in an example shown in FIG. 24. However, the image feature amount is luminance in the region in the example shown in FIG. 25. Here, as described above, the correlation between the luminance in a flare region of the first IR original image and the luminance in the region of the second IR original image corresponding to the flare region tends to become lower. Therefore, in the first IR original image, it is possible to further appropriately detect a flare region by detecting a region with high luminance and low correlation of the luminance as a flare region.

<Use of Census Transform>

Of course, an evaluation value for discriminating a flare region from a non-flare region does not need to be a correlation value. For example, Hamming distance and Census transform may be used.

Figure 26:
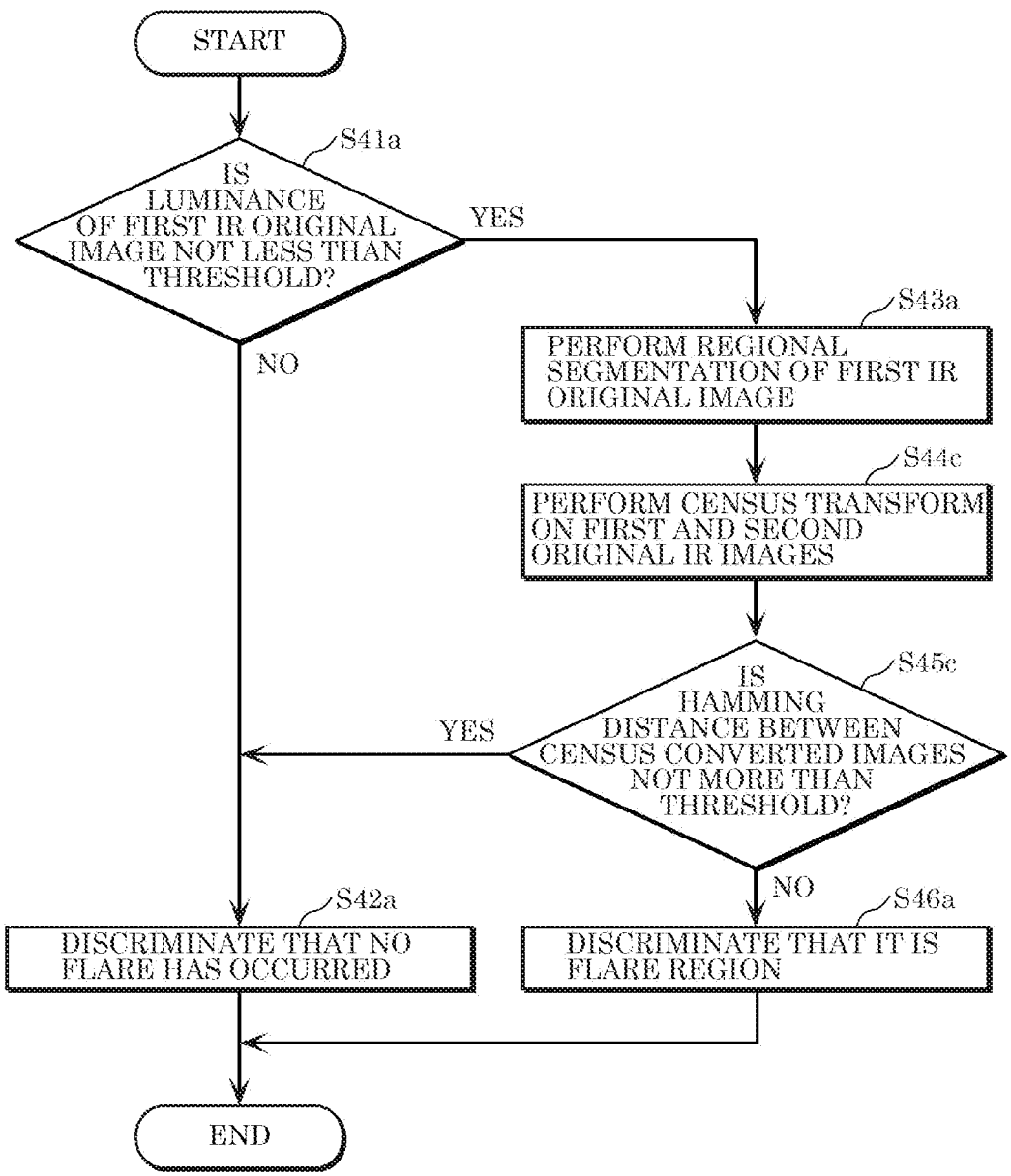
FIG. 26 is a flowchart illustrating another example of alternative processing of steps S31a to S34a of FIG. 23.

FIG. 26 is a flowchart illustrating another example of the alternative processing of steps S31a to S34a of FIG. 23. That is, FIG. 26 is a flowchart illustrating the detection process of a flare region using the Census transform of each of the first IR original image and the second IR original image. It should be noted that in FIG. 26, the same steps as those of FIG. 24 are given the same reference marks, and detailed description thereof will be omitted. The flowchart shown in FIG. 26, which is different from that shown in FIG. 24, includes steps S44c and S45c in place of steps S44a and S45a.

(Step S44a)

In step S44c, for each higher luminance region obtained by the regional segmentation in step S43a, flare detector 112 performs Census transform on the image of higher luminance region of the first IR original image, and the image of the corresponding region in the second IR original image. As a result of this, a Census converted image for the image of the higher luminance region of the first IR original image and a Census converted image for the image of the corresponding region in the second IR original image are generated.

(Step S45c)

Next, in step S45c, flare detector 112 calculates a Hamming distance between the Census converted image of the first IR original image obtained in step S44c and the Census converted image of the second IR original image. Then, when a value of the Hamming distance normalized with the number of pixels is not more than a sixth threshold (Yes in step S45c), flare detector 112 discriminates that flare and the like have not occurred in the higher luminance region (step S42a). On the other hand, when the value of normalized Hamming distance is more than the sixth threshold (No in step S45c), flare detector 112 judges that the texture is lost in the image of the higher luminance region due to the effect of flare and the like. Consequently, flare detector 112 discriminates the higher luminance region as a flare region (step S46a).

That is, for each of one or more higher luminance regions having a luminance not less than the fifth threshold in the first IR original image, flare detector 112 acquires a first converted image by performing Census transform on the image in the concerned higher luminance region. Then, flare detector 112 acquires a second converted image by performing Census transform on the image in the region of the second IR original image corresponding to the concerned higher luminance region. It should be noted that the first converted image and the second converted image are the above-described Census converted images. Next, flare detector 112 detects, as the flare region, a higher luminance region in which the Hamming distance between the first converted image and the second converted image is more than a sixth threshold, from at least one higher luminance region. In this way, it is also possible to appropriately detect a flare region by using the Census transform.

As described so far, in depth acquisition device 1 in the present embodiment and its variations, even when there is a flare region in the IR image, it is possible to acquire an appropriate depth at each position in the flare region by using the image of a corresponding region of the BW image.

It should be noted that each of the elements in the above-described embodiment may be configured in the form of an exclusive hardware product, or may be realized by executing a software program suitable for the element. Each of the elements may be realized by means of a program executing unit, such as a Central Processing Unit (CPU) or a processor, reading and executing the software program recorded on a recording medium such as a hard disk or semiconductor memory. The software program for realizing the depth acquisition device according to any of the above-described embodiment and its variations causes a computer to execute the steps in a corresponding one of the flowcharts in FIGS. 6, 7, 15 to 19, and 22 to 26.

Although the depth acquisition devices according to one or more aspects of the present disclosure have been described based on the embodiment and its variations, the present disclosure is not limited to them. Those skilled in the art will readily appreciate that an embodiment arrived at by making various modifications to the above embodiment and variations or an embodiment arrived at by selectively combining elements disclosed in the above embodiment and variations without materially departing from the scope of the present disclosure may be included within one or more aspects of the present disclosure.

It should also be noted that all or a part of the units and the devices according to the present disclosure or all or a part of the functional blocks in the block diagrams of FIGS. 1, 4, 5, 8, 20, and 21 may be implemented into one or more electronic circuits including a semiconductor device, a semiconductor Integrated Circuit (IC), or a Large Scale Integration (LSI). The LSI or the IC may be integrated into a single chip, or may be a combination of multiple chips. For example, the functional blocks except the storage element may be integrated into a single chip. Here, the LSI or the IC may be referred differently depending on the degree of integration, and may also be referred to as a system LSI, a Very Large Scale Integration (VLSI), or an Ultra Large Scale Integration (ULSI). A Field Programmable Gate Array (FPGA) which is programmable after manufacturing an LSI or a reconfigurable logic device capable of reconfiguring the connections or circuit segmentation in the LSI circuit may be used for the same purpose.

Furthermore, functions or operations of all or a part of the units, the devices, or a part of the devices may be realized by executing a software program. In this case, the software program is recorded on one or more nontransitory recording mediums such as a Read Only Memory (ROM), an optical disk, or a hard disk drive. When the software program is executed by a processor, the software program causes the processor and its peripheral devices to execute specific functions in the software program. The system or the device may include such one or more non-transitory recording medium on which the software program is recorded, a processor, and necessary hardware devices such as an interface.

INDUSTRIAL APPLICABILITY

The present disclosure is applicable to depth acquisition devices that acquire a depth of an image generated by imaging, for example, applicable to in-vehicle devices and the like.

What is claimed is:

1. An imaging device, comprising:
a light source that irradiates a subject with irradiation light;
a solid-state imaging element that performs first imaging of the subject and second imaging with reflected light, the reflected light being the irradiation light reflected by the subject; and
a processor that detects, based on an image outputted by the solid-state imaging element, a flare region where flare has occurred in the image due to imaging performed by the solid-state imaging element, and that generates and outputs output information based on the flare region detected.

2. The imaging device according to claim 1, wherein the irradiation light is infrared light.

3. The imaging device according to claim 2, wherein the solid-state imaging element acquires a visible light image by the first imaging of the subject and acquires an infrared light image by the second imaging with the infrared light.

4. The imaging device according to claim 3, wherein the processor performs acquiring timing information indicating a timing at which the light source irradiates the subject with the infrared light,
the infrared light image is generated by imaging a scene including the subject with the infrared light according to the timing indicated by the timing information;
the visible light image is generated by imaging a substantially same scene as the scene of the infrared light image, with visible light from a substantially same viewpoint as a viewpoint of the imaging the infrared light image at a substantially same time as an imaging time of imaging the infrared light image;
the processor performs detecting the flare region based on the infrared light image; and
the processor performs estimating a depth of the flare region based on the infrared light image, the visible light image, and the flare region.

5. The imaging device according to claim 4, wherein in the estimating of the depth of the flare region, the processor performs:
estimating first depth information indicating a depth at each position in the infrared light image;
estimating second depth information indicating a corrected depth at each position in the flare region, the corrected depth being obtained by correcting, based on the visible light image, a depth at each position in the flare region which is indicated in the first depth information; and
generating third depth information indicating (i) a depth at each position in a region other than the flare region in the infrared light image which is indicated in the first depth information and (ii) a depth at each position in the flare region in the infrared light image which is indicated in the second depth information.

6. The imaging device according to claim 4, wherein in the detecting of the flare region, the processor performs detecting, as the flare region, a region having a luminance not less than a first threshold in the infrared light image.

7. The imaging device according to claim 4, wherein in the detecting of the flare region, the processor performs detecting, as the flare region, a region having a luminance not less than a first threshold and satisfying a predetermined condition in the infrared light image, and
the predetermined condition is that a correlation value between (i) an image feature amount in a first region of the infrared light image and (ii) an image feature amount in a second region of the visible light image is less than a second threshold, the second region corresponding to the first region.

8. The imaging device according to claim 7, wherein the image feature amount in the first region of the infrared light image is an edge included in the first region, and
the image feature amount in the second region of the visible light image is an edge included in the second region.

9. The imaging device according to claim 7, wherein the image feature amount in the first region of the infrared light image is a luminance in the first region, and
the image feature amount in the second region of the visible light image is a luminance in the second region.

10. The imaging device according to claim 4, wherein in the detecting of the flare region, the processor performs for each of one or more higher luminance regions each having a luminance not less than a first threshold in the infrared light image:

(i) generating a first converted image by executing Census transform on an image in the each of the one or more higher luminance regions;
(ii) generating a second converted image by executing Census transform on an image in a region of the visible light image, the region corresponding to the each of the one or more higher luminance regions; and
detecting, as the flare region, a higher luminance region having a Humming distance greater than a third threshold from the one or more higher luminance regions, the Humming distance being a Humming distance between the first converted image and the second converted image.

11. The imaging device according to claim 4, wherein in the estimating of the depth of the flare region, the processor performs:
estimating depth information indicating a depth at each position in the infrared light image; and
correcting a depth at each position in the flare region which is indicated in the depth information, by inputting the infrared light image, the visible light image, the flare region, and the depth information into a learning model.

12. The imaging device according to claim 3, comprising:
a memory storing the infrared light image and the visible light image,
wherein the processor performs:
acquiring the infrared light image stored in the memory, the infrared light image being generated by imaging with infrared light;
acquiring the visible light image stored in the memory, the visible light image being generated by imaging with visible light from a substantially same viewpoint as a viewpoint of the imaging the infrared light image at a substantially same timing as the timing of imaging the infrared light image;
detecting, as a flare region, a region showing flare from the infrared light image, based on the infrared light image; and
estimating a depth of the flare region based on the visible light image.

13. An imaging method, comprising:
irradiating a subject with irradiation light;
performing, with a solid-state imaging element, first imaging of the subject and second imaging with reflected light, the reflected light being the irradiation light reflected by the subject; and
detecting, based on an image outputted by the solid-state imaging element, a flare region where flare has occurred in the image due to imaging performed by the solid-state imaging element; and
generating and outputting output information based on the flare region detected.

14. A non-transitory computer-readable recording medium having recorded thereon a program for causing the program to execute:
irradiating a subject with irradiation light;
performing, with a solid-state imaging element, first imaging of the subject and second imaging with reflected light, the reflected light being the irradiation light reflected by the subject; and
detecting, based on an image outputted by the solid-state imaging element, a flare region where flare has occurred in the image due to imaging performed by the solid-state imaging element; and
generating and outputting output information based on the flare region detected.

* * * * *